US008313372B2

(12) United States Patent
Naicker et al.

(10) Patent No.: US 8,313,372 B2
(45) Date of Patent: Nov. 20, 2012

(54) ELECTRONIC GAMING ENVIRONMENT WITH DISPLAY OF MULTIPLE INSTANCES OF SINGLE-PLAYER GAMES AND MULTIPLAYER BONUS GAME

(75) Inventors: Theo Naicker, Durban (ZA); Hylton David Rottcher, Kloof (ZA); Duncan Andrew Keith McRoberts, Westbrook (ZA)

(73) Assignee: Cork Group Trading Ltd., Tortola (VG)

( * ) Notice: Subject to any disclaimer, the term of this patent is extended or adjusted under 35 U.S.C. 154(b) by 749 days.

(21) Appl. No.: 12/462,730

(22) Filed: Aug. 7, 2009

(65) Prior Publication Data

US 2011/0034240 A1 Feb. 10, 2011

(51) Int. Cl.
*A63F 13/00* (2006.01)

(52) U.S. Cl. ............ 463/25; 463/16; 463/20; 273/142 R

(58) Field of Classification Search .................... 463/16, 463/20, 25; 273/142 R
See application file for complete search history.

(56) References Cited

U.S. PATENT DOCUMENTS

| | | | | |
|---|---|---|---|---|
| 4,836,553 A | 6/1989 | Suttle et al. | 273/292 |
| 5,374,067 A | 12/1994 | Jones | 273/292 |
| 5,380,012 A | 1/1995 | Jones et al. | 273/292 |
| 5,382,025 A | 1/1995 | Sklansky et al. | 273/292 |
| 5,395,120 A | 3/1995 | Malek | 273/292 |
| 5,397,133 A | 3/1995 | Penzias | 463/22 |
| 5,564,700 A * | 10/1996 | Celona | 463/27 |
| 5,586,937 A | 12/1996 | Menashel | 463/41 |
| 5,848,932 A * | 12/1998 | Adams | 463/20 |
| 5,935,002 A | 8/1999 | Falciglia | 463/19 |
| 5,971,397 A | 10/1999 | Miguel et al. | 273/371 |
| 5,971,849 A | 10/1999 | Falciglia | 463/16 |

(Continued)

FOREIGN PATENT DOCUMENTS

CA 2415274 12/2002

(Continued)

OTHER PUBLICATIONS

Supplementary European Search Report in EP 04 78 7542, dated Nov. 7, 2007.

(Continued)

*Primary Examiner* — David L Lewis
*Assistant Examiner* — William H McCulloch, Jr.
(74) *Attorney, Agent, or Firm* — McDonnell Boehnen Hulbert & Berghoff LLP

(57) ABSTRACT

A gaming server, game playing apparatus and a method for facilitating play of a multiplayer game by multiple players each playing an instance of single-player wager game at a workstation having a display. Multiple single-player wager game instances are aggregated into a multiplayer game environment. In the single-player wager game, one of the possible rewards for a turn of play is an award of a multiplier credit useable in a bonus game. The bonus game is played by those players having accumulated at least one multiplier credit at the time the bonus game is triggered. A result in the bonus game is generated randomly by a bonus machine from a finite set of possible results. The winnings in the bonus game is the product of the player's multiplier credit multiplied by the result. Winnings are obtained from the game proprietor, are independent of results for other players, and are not shared with such other players. The bonus machine can take several forms, including a wheel, a reel, or a machine randomly selecting a numbered ball.

26 Claims, 13 Drawing Sheets

U.S. PATENT DOCUMENTS 6,007,066 A 12/1999 Moody ........................ 273/292
6,012,720 A 1/2000 Webb ........................ 273/292
6,089,980 A 7/2000 Gauselmann ................ 463/292
6,206,782 B1 * 3/2001 Walker et al. .................. 463/25
6,210,275 B1 * 4/2001 Olsen ........................ 463/16
6,237,916 B1 5/2001 Webb ........................ 273/292
6,264,560 B1 7/2001 Goldberg et al. .............. 463/42
6,345,823 B1 2/2002 Webb ........................ 463/16
6,416,411 B1 7/2002 Tsukahara ...................... 463/35
6,511,068 B1 1/2003 Sklansky et al. .............. 273/237
6,569,015 B1 * 5/2003 Baerlocher et al. ............ 463/16
6,582,307 B2 * 6/2003 Webb ........................ 463/22
6,612,927 B1 9/2003 Slomiany et al. .............. 463/16
6,652,378 B2 * 11/2003 Cannon et al. .................. 463/20
6,679,777 B2 1/2004 Pfeiffer et al. .................. 463/42
6,692,355 B2 * 2/2004 Baerlocher et al. ............ 463/16
6,755,741 B1 6/2004 Rafaeli ........................ 463/25
6,843,722 B2 * 1/2005 Webb ........................ 463/16
6,860,810 B2 * 3/2005 Cannon et al. .................. 463/20
6,887,157 B2 * 5/2005 LeMay et al. .................. 463/32
6,999,083 B2 2/2006 Wong et al. .................. 345/473
7,094,154 B2 8/2006 Kellerman et al. ............ 463/42
7,144,321 B2 * 12/2006 Mayeroff ...................... 463/16
7,179,169 B2 * 2/2007 Beaulieu et al. ................ 463/25
7,192,351 B2 3/2007 Rozkin et al. .................. 463/20
7,311,598 B2 * 12/2007 Kaminkow et al. ............ 463/16
7,311,604 B2 * 12/2007 Kaminkow et al. ............ 463/20
7,419,429 B2 * 9/2008 Taylor ........................ 463/25
7,427,236 B2 * 9/2008 Kaminkow et al. ............ 463/26
7,442,123 B2 * 10/2008 Brill et al. .................... 463/20
7,488,249 B2 * 2/2009 Hughs-Baird et al. .......... 463/20
7,637,808 B2 * 12/2009 Roukis ........................ 463/20
7,722,462 B2 * 5/2010 Mayeroff ...................... 463/25
7,771,267 B2 * 8/2010 Mayeroff ...................... 463/20
7,854,654 B2 * 12/2010 Baerlocher et al. ............ 463/27
7,934,994 B2 * 5/2011 LeMay et al. .................. 463/32
8,118,662 B2 * 2/2012 Caputo et al. .................. 463/20
RE43,297 E * 4/2012 Taylor ........................ 463/25
8,152,622 B2 * 4/2012 Kim ........................ 463/17
2002/0028707 A1 3/2002 Pascal et al. .................. 463/42
2002/0042296 A1 4/2002 Walker et al. .................. 463/23
2002/0052229 A1 5/2002 Halliburton et al. .............. 463/9
2002/0183105 A1 * 12/2002 Cannon et al. .................. 463/16
2003/0130041 A1 7/2003 Pascal et al. .................. 463/42
2004/0023722 A1 2/2004 Vuong et al. .................. 463/40
2004/0106446 A1 * 6/2004 Cannon et al. .................. 463/16
2004/0121838 A1 * 6/2004 Hughs-Baird et al. .......... 463/25
2004/0147306 A1 * 7/2004 Randall et al. .................. 463/20
2004/0152508 A1 8/2004 Lind et al. .................. 463/19
2004/0192442 A1 9/2004 Wells et al. .................. 463/36
2004/0204213 A1 10/2004 Schugar et al. .................. 463/6
2004/0204246 A1 10/2004 Halliburton et al. ............ 463/42
2004/0256803 A1 12/2004 Ko ........................ 273/292
2004/0266516 A1 * 12/2004 Thomas ........................ 463/20
2005/0043094 A1 2/2005 Nguyen et al. .................. 463/42
2006/0040732 A1 * 2/2006 Baerlocher et al. ............ 463/25
2006/0046821 A1 * 3/2006 Kaminkow et al. ............ 463/16
2006/0063584 A1 * 3/2006 Brill et al. .................... 463/20
2006/0079331 A1 * 4/2006 Moshal ........................ 463/42
2006/0084499 A1 4/2006 Moshal ........................ 463/25
2007/0069460 A1 * 3/2007 Hein et al. ................ 273/142 R
2007/0191109 A1 8/2007 Crowder et al. ................ 463/42
2008/0045302 A1 * 2/2008 Low ........................ 463/20
2009/0111560 A1 4/2009 Davis et al. .................. 463/20
2010/0291991 A1 * 11/2010 Baerlocher et al. ............ 463/20
2011/0034240 A1 * 2/2011 Naicker et al. .................. 463/27
2011/0118002 A1 * 5/2011 Aoki ........................ 463/20
2011/0269523 A1 * 11/2011 Nicely et al. .................. 463/18
2012/0021822 A1 * 1/2012 DeWaal et al. ................ 463/29
2012/0100914 A1 * 4/2012 Frank et al. .................. 463/31

FOREIGN PATENT DOCUMENTS

WO WO 03/093921 11/2003
WO WO 2005/033825 4/2005
WO WO2007/030632 3/2007
WO WO2009/134813 11/2009

OTHER PUBLICATIONS

International Search Report and Written Opinion in PCT/IB04/03179, application of Waterleaf, Ltd, dated Aug. 1, 2005.
Extended European Search Report in EP 10251411.4 dated Nov. 11, 2010.

* cited by examiner

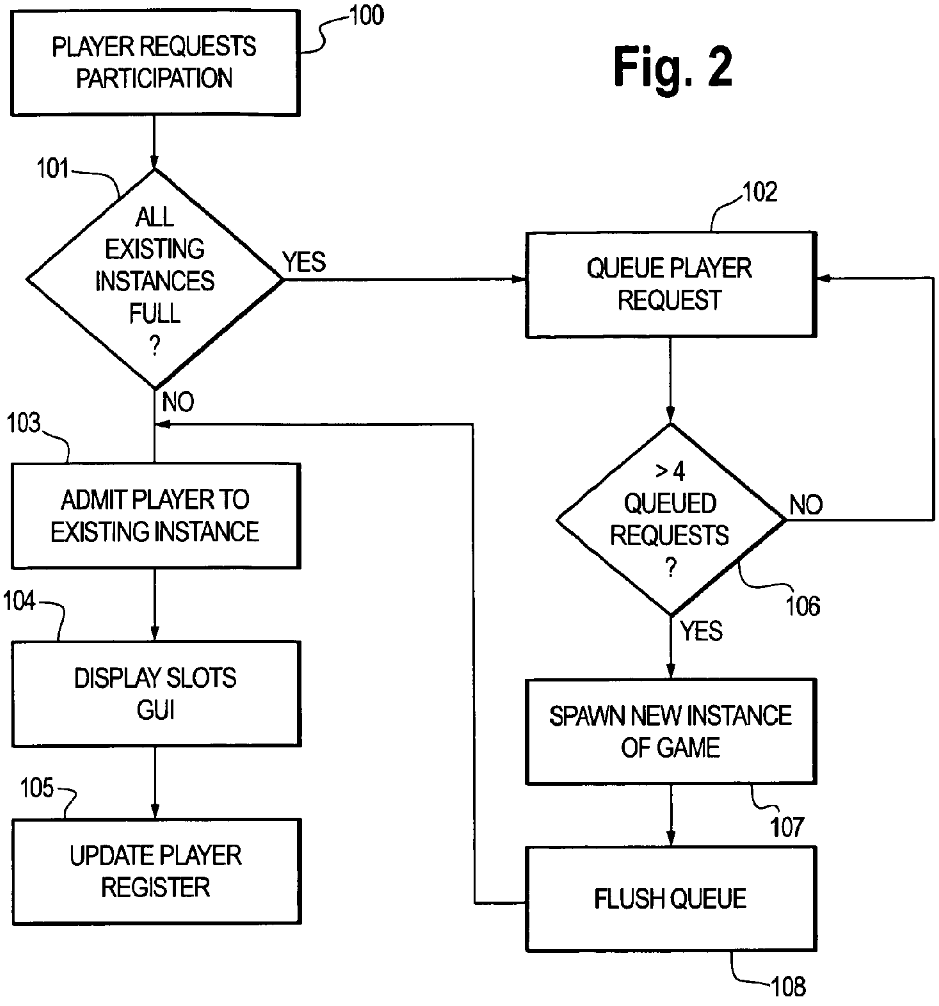
Fig. 2
Fig.3
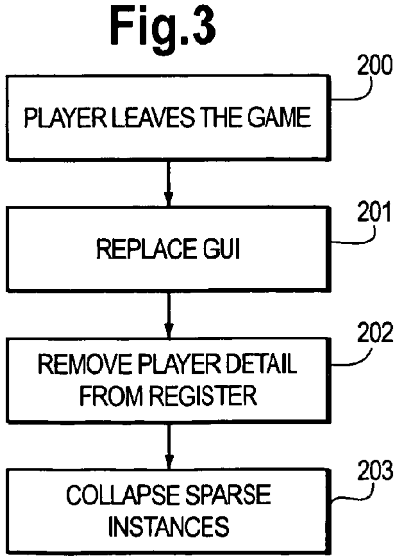

ELECTRONIC GAMING ENVIRONMENT WITH DISPLAY OF MULTIPLE INSTANCES OF SINGLE-PLAYER GAMES AND MULTIPLAYER BONUS GAME

STATEMENT OF FEDERALLY SPONSORED RESEARCH

Not applicable.

FIELD OF THE INVENTION

This disclosure relates generally to electronic gaming systems enabling a player to play a single-player game on a gaming workstation such as a general purpose computer or a video gaming terminal. The disclosure further relates to an electronic gaming system including a central gaming server providing data to a gaming workstation indicating the outcome of play of multiple instances of a single-player game occurring simultaneously. The disclosure also relates to an electronic gaming system in which the central gaining server provides data to the gaming workstation indicating the outcome of play of a multiplayer bonus game.

RELATED ART

The game of poker is a multiplayer game that is widely played in many jurisdictions, particularly in the United States of America. The game of poker is a zero-sum game insofar as, in each turn of the game, a gain of the winner is equal to accumulated losses of the other players in the game. It is, however, also known for a party who arranges or hosts a game of poker to levy a commission (a “rake”) on the participating players or on the accumulated wagers of all the players participating in that turn of the poker game (the “pot”) in order to obtain revenue.

The game of poker is played at both land-based venues and on-line, in the latter instance by means of the Internet. Where the game is played on-line, a software program spawns multiple instances of the game, each instance being known as a “poker room”, to accommodate players wishing to participate in the game. Thus, any instance of the game, or poker room, accommodates participating players who may be geographically remote from each other. The software program offers the participating players with various artifices such as, for example, a chat facility, which allows the players to interact with each other, thereby establishing a sense of community such as would be found at a game being played at a land-based venue.

The game of slots is probably the most popular and widely played single-player casino game available to players. The most common game of slots is found in a simple three-reel slot machine. Each reel of the slot machine has, say, 30 indexed positions, some or all of which may display a corresponding indicium. A player of the slot machine is required to place a wager on an outcome of the casino game by introducing coins, tokens or credit into the slot machine, which then enables each of the three reels to be spun and to come to rest at any of the indexed positions. An outcome of the game is determined as a function of a combination of the three resulting indexed rest positions. Several outcomes of the game usually result in the player being awarded corresponding prizes, one particular outcome causing the player to win a jackpot prize. A slot machine with the particular characteristics described above has a jackpot cycle of 27,000, which means that, on average, 27,000 outcomes of the game must be determined in order for the jackpot to be won by the player.

The three reel slot machine described above may be a free-standing electro-mechanical or electronic machine suitable for use in a land-based venue, or may, alternatively, be an on-line implementation, where the three reels of the slot machine are simulated on a display monitor, while an outcome of the game is derived from a random number generator implemented in software. It will be appreciated that the game of slots is a single-player game, unlike the game of poker described above. Although banks of slot machines may be found in land-based casinos, each player at such a bank of machines is playing the game individually for himself. An advantage of such single-player games is that of rapid play and the immediacy of a result in a turn of a game.

U.S. patent application publication 2006/0079331, the content of which is incorporated by reference herein, discloses a multiplayer gaming system which facilitates play of a single-player game having a plurality of possible results. The system includes a gaming server communicable with the workstation. The server is operable to transmit data to the workstation comprising the outcome of multiple instances of a single-player game, including the game being played on the instant workstation as well as an instance of the game being played simultaneously on another workstation. The workstation may then display the outcome of multiple instances of the single-player game. Ordinarily, the display of the other instances is for presentation purposes only and the player does not wager on the other instances. Rather, the display of the other instances is provided to simulate a land-based casino experience. In one embodiment, it facilitates a play of a multiplayer game based on the outcomes of separate instances of a single-player game.

U.S. patent application publication 2006/0084499, which is also incorporated by reference herein, discloses an application web server which is operable to determine an outcome of the multiplayer game as a function of the combined results of the separate instances of the single-player game played at the plurality of player stations. The outcome of the multiplayer game is either a favorable outcome if one or more participating players are determined by the application web server as being a winner of the multiplayer game, or an unfavorable outcome in which none of the participating players is determined as being a winner. A single turn of the multiplayer game includes at least one turn of an instance of the single-player game at each one of the plurality of player stations in use by a participating player. The application web server determines an outcome of a turn of the multiplayer game only after completion of at least one turn of an instance of the single-player game for each participating player, respectively, and awards a prize to the winning player when the outcome of the turn of the multiplayer game is a favorable outcome.

In the games of U.S. patent application publication 2006/0084499, each player contributes to a pool of prize money for the multiplayer game by virtue of making wagers on the single-player games. The pool of prize money is divided among the one or more players. As such, the pool of prize money is player funded, not funded by the house or game proprietor. Moreover, since players may have to share or split their prize depending on the results of the multiplayer game achieved by other players, this limits the potential upside for each player by factors beyond their control, namely the results achieved by other players.

In contrast, this disclosure features an aggregation of players playing single-player games in a multiplayer gaming environment in which the aggregated players collectively and simultaneously play a multiplayer bonus game. The initiation of the bonus game is triggered randomly and player participation in the bonus game is subject to the player achieving a certain threshold condition, namely accumulation of at least one multiplier credit. Unlike the multiplayer games of publication 2006/0084499, (1) the players play against the house or game proprietor, not a prize pool that is formed from wagers of other players, and (2) the players do not have to share their prize in the multiplayer game with other players, that is, any winnings they achieve in the multiplayer game are completely independent of the successes or lack thereof of the other players in play of the bonus game.

Other prior art of interest included a casino slots arrangement found in some casinos in the United States in which players play at a bank of slot machines but are aggregated into a bonus game which is triggered randomly. During the play of the slots game, the players accumulate a multiplier credit that is used during the play of the bonus game. However, if the player's rate of play slows down (e.g., they take a short break or are distracted and temporarily stop playing), their multiplier credit decreases. If the "down time" is sufficiently long their multiplier credit can potentially evaporate, thereby preventing them from obtaining any winnings in the bonus game. This aspect of the game is designed to motivate the players to play continuously and indeed wager as much as possible during play of the single-player game in order to accumulate as much multiplier credit as possible and not lose any of it. This adds stress to the player and is inconvenient, for example if they have to take a break to obtain refreshment, make or receive a phone call, use the restroom, and so forth.

A second casino game found in the United States includes players seated around the periphery of a large "Wheel of Fortune" type wheel, with the players each playing a separate video slots game. A bonus game involving a spin of the wheel is triggered when any one of the players obtains a particular triggering result on their video slots game. Unless one of the players obtains the particular triggering result, the bonus game does not trigger. A brief delay occurs after a player first obtains the triggering. If, during this period, one of the other players also obtains the triggering result, they also play the bonus game. During the bonus game, the wheel is spun. The spokes of the wheels have numerical values (e.g. dollars, or values of credit) assigned to them. The player(s) participating in the bonus game win the value on the spoke of the wheel that lands at their position around the perimeter of the wheel.

While the bonus game of this disclosure has similarities to the above-described casino games, it differs in several important respects. Unlike the first casino game described above, a player's multiplier credit for use in the play of the bonus game is not dependent on the rate of play; rather, it accumulates and cannot go down, e.g., due to a slowing of the rate of play or temporary hiatus in play. As such, the games of this disclosure avoid the inconveniences described above. Unlike the second casino game, the initiation of the bonus game is triggered randomly, and not as a consequence of a particular outcome achieved by a participating player in an instance of the single-player game. Moreover, in the second casino game, the players' ability to participate in the bonus game is dependent on the activity of the other players, namely the time that elapses before one of the other players obtains the triggering result. In the prior art game, players are in some sense competing against the other players since the player must either be the first to obtain the triggering result or else achieve the triggering result within a matter of seconds of the first player obtaining the triggering result. This also adds stress to the player and potentially eliminates their ability to obtain winning results in the bonus play, and can cause the player to become discouraged.

Thus, this disclosure proves for methods and apparatus for playing a multiplayer bonus games that overcomes the disadvantages of the prior art.

SUMMARY

In a first aspect, a gaming server is disclosed having a central processing unit and a memory storing program instructions for execution by the central processing unit. The central processing unit generates results of play of multiple instances of a single-player wager game. The multiple instances are aggregated into a multiplayer gaming environment. In a preferred format, the multiplayer gaming environment consists of an environment in which each player can view the results of play of not only their own wager game but also the result of the other players. The multiple instances of the single-player game are played by multiple players each using workstations communicating with the gaming server over a communications network. This network can be either a local area network or a wide area network, such as the Internet.

The single-player wager game features a pay table in which one of the possible rewards for a turn of play of the single-player wager game is an award of a multiplier credit which is useable in a bonus game aspect of the single-player wager game.

The gaming server is operative to randomly initiate the play of a bonus game. During play of the bonus game, play of all of the aggregated instances of the single-player wager game is temporarily suspended.

The bonus game is only played by those players who have accumulated at least one multiplier credit prior to the initiation of play of the bonus game by the gaming server; the multiplier credit is accumulated by virtue of play of the single-player wager game and the player having achieved a reward of the multiplier credit.

During play of the single-player game, the multiplier credit for the players accumulates during a period prior to the triggering of the bonus game by the gaming server and is not subject to decrease during this period, for example due to change in the rate of play or a temporary interruption of play by the player, e.g., to make a phone call or obtain refreshment.

Additionally, the bonus game is characterized by a result for each player participating in the bonus game which randomly generated from a set of finite possible outcomes. The manner in which this result is randomly obtained can vary and several possibilities for generating such result (and bonus machines for generating the result) are contemplated, including spinning wheels, a slot machine-like reel, and a machine randomly selecting a ball or other device, or a random number generator implemented on a programmed computer (e.g., in the gaming server). The winnings in the bonus game are the product of the multiplier credit, accumulated during play of the single-player game, multiplied by the result generated by the bonus machine. The bonus game is further characterized as one in which a player participating in the bonus game obtains the winnings in the bonus game from the proprietor of the game and their winnings are independent of results for other players participating in the bonus game and are not shared with such other players.

In one configuration, the single-player wager game comprises a video slots game. However, the single-player game can vary and take other forms, such as for example Roulette. In one embodiment, the video slots game comprises a five reel slots game having a multitude of pay lines. In this embodiment, the pay table comprises a table of credit awards for particular combinations of symbols appearing on one or more pay lines, the pay table further comprising awards of multiplier credits awarded to the player for the occurrence of two or more like symbols associated with bonus game multiplier credit appearing on the one or more pay lines. However, the design of the pay table may take other forms depending on which game is implemented as the single-player game.

In one possible embodiment, the workstations and the gaming server are implemented in a physical casino environment, such as land or ship-based casino. Thus, in one possible configuration a casino is claimed having the gaming server and workstations as described above. The workstations may take the form of video slot machines. The casino may further include a bonus machine, such as a physical wheel, and wherein the workstations are physically arranged around the periphery of the wheel, or alternatively a machine which randomly selects a numbered ball for each player of the bonus game to determine the bonus award.

In another aspect of this disclosure, a multiplayer wager game apparatus is disclosed, comprising, in combination, a bonus machine randomly generating a result from a set of finite possible outcomes, a plurality of workstations and a gaming server in communication with the plurality of workstations over a communications network. The gaming server includes a central processing unit and a memory storing program instructions for execution by the central processing unit, the central processing unit generating results of play of multiple instances of a single-player wager game played by the plurality of workstations. The single-player wager game features a pay table in which one of the possible rewards for a turn of play of the single-player wager game is an award of a multiplier credit useable in a bonus game aspect of the single-player wager game. The gaining server is operative to randomly initiate the play of the bonus game wherein during play of the bonus game, play of the single-player wager game by the workstations is temporarily suspended. Furthermore, the bonus game is played by those players having accumulated at least one multiplier credit prior to the initiation of play of the bonus game by the gaming server. Additionally, multiplier credit for the players accumulates during a period prior to the triggering of the bonus game by the gaming server and is not subject to decrease during this period due to change in the rate of play or temporary interruption of play by the player. Furthermore, the bonus game is characterized by a result for each player participating in the bonus game randomly generated by the bonus machine from the set of finite possible outcomes, and winnings in the bonus game being the product of the multiplier credit multiplied by the result, whereby a player participating in the bonus game obtains the winnings in the bonus game from the proprietor of the game and their winnings are independent of results for other players participating in the bonus game and are not shared with such other players.

In yet another aspect, a method for facilitating play of a multiplayer game by multiple players each playing an instance of single-player wager game at a workstation having a display. The method includes a step of, in a gaming server, aggregating multiple single-player wager game instances into a multiplayer game environment wherein the gaming server transmits datagrams to the workstations containing information whereby each player can view game action of other aggregated players on their display in addition to their own game action. The method further includes the step of providing in the single-player wager game a pay table in which one of the possible rewards for a turn of play of the single-player wager game is an award of a multiplier credit useable in a bonus game aspect of the single-player wager game. The gaming server randomly initiates play of the bonus game wherein during play of the bonus game, play of the single-player wager game by the workstations is temporarily suspended. The bonus game is played by those players having accumulated at least one multiplier credit prior to the initiation of play of the bonus game by the gaming server. The multiplier credit for the players accumulates during a period prior to the triggering of the bonus game by the gaming server and is not subject to decrease in this period due to change in the rate of play or temporary interruption of play by the player. The method further includes the step of generating for each player participating in the bonus game a result, the result generated randomly from the set of finite possible outcomes, wherein the winnings in the bonus game for a player participating in the bonus game is the product of the player's multiplier credit multiplied by the result, whereby a player participating in the bonus game obtains the winnings in the bonus game from the proprietor of the game and their winnings are independent of results for other players participating in the bonus game and are not shared with such other players.

In one possible implementation of the method of this disclosure, the result generated for the players during the bonus game is generated randomly by a device referred to herein as a "bonus machine." The bonus machine can take various forms. The bonus machine generates a result for each player from a limited set of possible outcomes. For example, in one form the bonus machine comprises a spinning wheel (either virtual or physical) having a multitude of spokes or sectors, each spoke being assigned a result in the form of an integer ("wheel multiplier"), with a player participating in the bonus game winning an amount equal to their accumulated multiplier credit at the time of initiation of the play of the bonus game multiplied by the wheel multiplier for the spoke of the wheel that comes to a rest in a position around the periphery of the wheel which is associated with the player. In another possible embodiment, the bonus machine is in the form of one or more spinning reels each having a pay line, the reel(s) having indexed positions, each comprising a result in the form of an integer, wherein the winning in the bonus game for a player participating in the bonus game is the product of the integer coming to rest on the pay line multiplied by the multiplier credit for such player. As another example, the bonus machine takes the form of a device randomly selecting a ball from a plurality of balls, each of the plurality of balls bearing a result in the form of an integer, wherein the winning in the bonus game for a play participating in the bonus game is the product of the integer multiplied by the multiplier credit for such player. The bonus machine could also take the form of a random number generator, e.g. a general purpose computer, programmed to randomly select an integer ("result") from a finite set of integers (e.g., 5, 10, 20, 50, 100 and 200). Still further embodiments for a bonus machine randomly generating a result from a set of possible results are possible and within the scope of the present disclosure.

BRIEF DESCRIPTION OF THE DRAWINGS

Embodiments of the invention are described, below, by way of example only, and with reference to the appended drawing figures, in which:

FIG. 2 is a flow diagram of the steps required for a player to participate in a multiplayer game in the multiplayer gaming system of FIG. 1;

FIG. 3 is a flow diagram of the steps required for a participating player to leave an instance of the multiplayer game in the multiplayer gaming system of FIG. 1.

DETAILED DESCRIPTION

Overview

Figure 1:
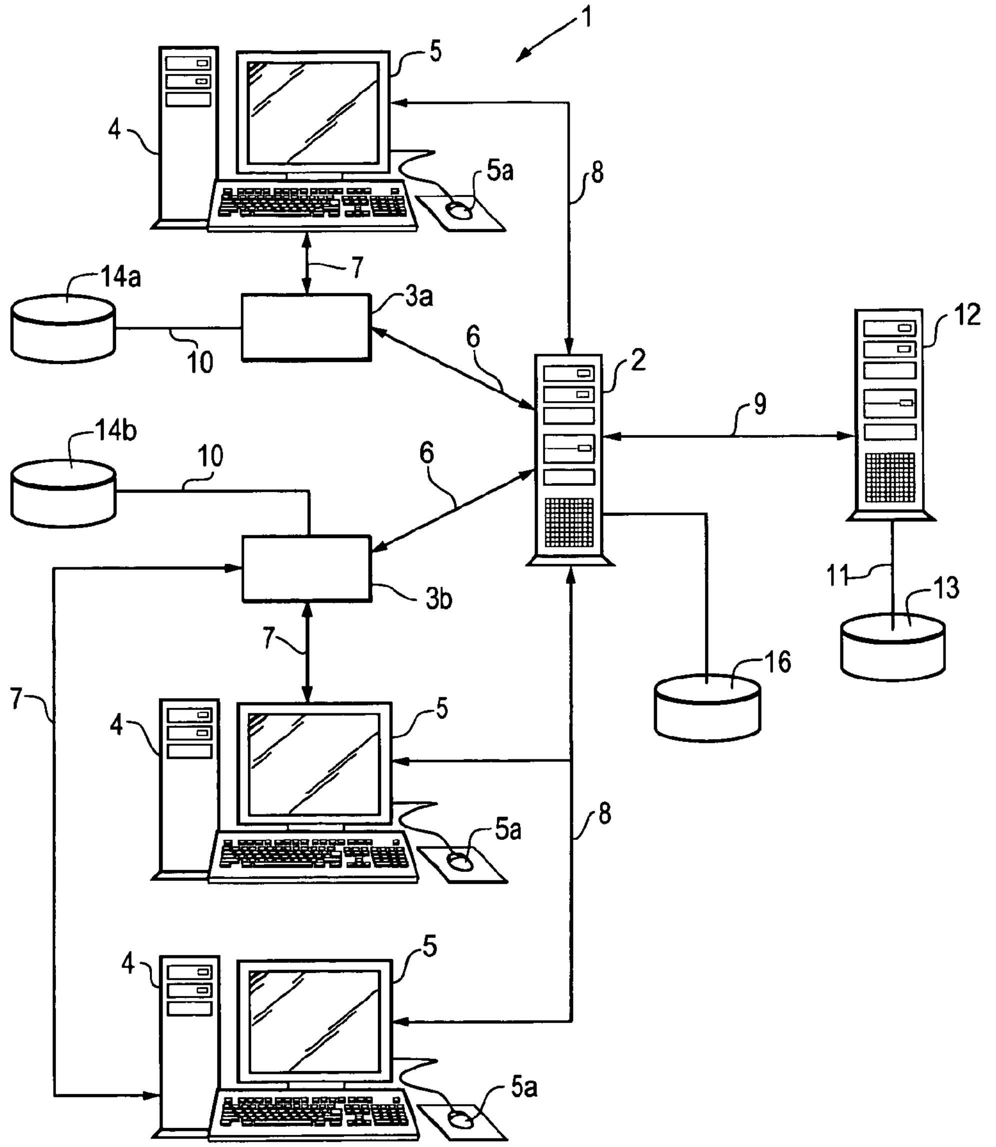
FIG. 1 is functional diagram of a multiplayer gaming system.

A multiplayer gaming system is described which facilitates a number of players to each play a separate instance of a single-player game having a plurality of possible results. The system includes a central gaming server communicable with each one of the plurality of gaming workstations via a communications network, which may take a variety of forms (such as the Internet or a local area computer network) the details of which are not particularly important. The gaming server includes a central processing unit and a memory storing program instructions for executing by the central processing unit, which is convention. The gaming server may take the form of a general purpose computer.

The gaming server is operative to generate results of play for multiple instances of play played by the workstations and is further operable to send data to each workstation whereby the workstation may display outcomes of multiple instances of the single-player game, including the game instance being played on the instant workstation as well as instances of the games currently being played on workstations used by other players. In this regard, the multiple workstations are aggregated into a multiplayer gaming environment. Examples of such single-player games include video slots, video roulette, and single-player card games. The server is also operable to send data to each workstation whereby the workstation may display the outcome of a multiplayer bonus game in which each player playing the single-player game may participate.

Published PCT application WO 03/093921 A2, published Nov. 13, 2003, which is assigned to the assignee of the present invention, discloses a system whereby multiple distributed gaming workstations may engage in gaming activity via a central gaining server over a computer network such as the Internet. The entire contents of WO 03/093921 A2 are incorporated by reference herein. In one embodiment, the methods are implemented in a system of the type disclosed in the '921 published application.

The display of the plurality of instances of single-player games, including those of other players, emulates a land-based casino experience, for example the experience one has when in Las Vegas playing slots in a slot machine bank where one can look over at other players' slot machines and observe their action. The display of other instances allows the player to see and participate vicariously in the gaming action of other players (albeit without the risk or potential reward), just as in a land-based casino. In the present disclosure, the display of the multiple instances of the single-player game may be accompanied by sound effects, such as casino background noise, machine sounds (e.g., sounds produced by a slot machine), playing sounds (such as a spinning roulette wheel, cards being dealt, etc.) and voice sounds including celebratory sounds when one of the other instances of the game produces a winning result. As such, the simulated casino experience is further enhanced.

One embodiment will be described below where the displayed multiple instances of a single-player game enable the players to collectively participate in a multiplayer bonus game based on the outcomes of the individual instances of the single-player game, and in particular based on the accrual of what is referred to below as multiplier credit. Basically, the single-player wager game features a pay table in which one of the possible rewards for a turn of play of the single-player wager game is an award of a multiplier credit which is useable in the bonus game. Selection of a result in the bonus game is made by a "bonus machine", which can take several forms, including a spinning wheel, slot machine reel, or device randomly selecting a numbered ball from group of balls.

During play of the bonus game, play of all of the aggregated instances of the single-player wager game is temporarily interrupted, and all players that accumulated one or more multiplier credits as of the start of the bonus game play the bonus game while the other players stand by and watch the bonus game.

The bonus game is initiated randomly by the gaming server. In preferred embodiments, it is not triggered by a player action, per se, and one player's game action does not affect the time in which the bonus game is initiated. Alternatively, the bonus game is randomly triggered at some time after at least one player accumulates at least one multiplier credit. The bonus game is only played by those players who have accumulated at least one multiplier credit prior to the initiation of play of the bonus game by the gaming server. The multiplier credit is accumulated by virtue of play of the single-player wager game, and the player having achieved a reward of the multiplier credit as per the pay table.

During play of the single-player game, the multiplier credit for the players accumulates during a period prior to the triggering of the bonus game by the gaming server and is not subject to decrease during this period, for example due to change in the rate of play or a temporary interruption of play by the player, e.g., to make a phone call or obtain refreshment.

Additionally, the bonus game is characterized by generating a result for each player participating in the bonus game randomly from a set of finite possible outcomes. The manner in which this result is randomly generated can vary and several examples of machines generating such result randomly are contemplated, including spinning wheels, a slot machine-like reel, and a machine randomly selecting a ball or other device, or a random number generator implemented on a programmed computer (e.g., in the gaming server). The winnings in the bonus game are the product of the multiplier credit, accumulated during play of the single-player game, multiplied by the result generated by the bonus machine. The bonus game is further characterized as one in which a player participating in the bonus game obtains the winnings in the bonus game from the proprietor of the game and their winnings are independent of results for other players participating in the bonus game and are not shared with such other players.

Embodiment with Single-Player Games Linked to a Multiplayer Bonus Game

Embodiments will be described initially with particular reference to a multiplayer bonus game that is based on multiple separate instances of a single-player wager game in the form of video slots.

Referring to FIG. 1, a multiplayer gaming system is indicated generally by reference numeral (1). The multiplayer gaming system (1) includes a central gaming server (2), and a number of portals (3*a*, 3*b*) in the form of portal websites on the World Wide Web of the Internet. In this embodiment, each one of the portal websites is an online casino website hosted on a corresponding casino web server (not shown). For convenience, this particular embodiment of the invention will be described with particular reference to only two such online casino websites (3*a*, 3*b*). Each one of the online casino websites (3*a*, 3*b*) is accessible by a would-be video slots player (not shown) through a player gaming workstation (4) in the form of an Internet-enabled computer workstation having a display monitor (5) and an associated pointing device (5*a*) such as a mouse or, alternatively, a touchpad. In this embodiment, online casino website (3*a*) is shown as having one computer workstation (4) logically connected thereto, whereas casino website (3*b*) is shown as being logically connected to two computer workstations (4). It will be appreciated by those skilled in the art that such online casino websites (3*a*, 3*b*) can be logically connected to any desired number of such computer workstations (4) simultaneously, which number is physically limited only by considerations of processing power and Internet access bandwidth.

The apparatus (1) includes, further, an administration facility (12) in the form of an application web server, which is communicable with the gaming server (2) along a communication network (9). The detailed operation of the application web server (12) will be outlined in the description that follows.

The gaming server (2), the online casino web servers (not shown) corresponding to the online casino websites (3*a*, 3*b*), the computer workstations (4) and the application web server (12) are capable of communicating with each other by means of an open communication network that is, in this embodiment, the Internet. The Internet is represented in FIG. 1 as separate logical communication networks (6, 7, 8, 9, 10 and 11). The particular networking topology used and presence of intermediate networks or switching equipment is not important, and may for example make use of intervening communications network such as the public switched telephone network, cable networks, cellular wireless networks, WiFi, etc.

The application web server (12) operates a clearing account facility (13) that has a clearing account corresponding to each one of the online casino websites (3*a*, 3*b*). Analogously, each online casino website (3*a*, 3*b*) includes a corresponding credit account facility (14*a*, 14*b*) with a credit account corresponding to each player who participates in a game offered by the online casino. In the illustrated embodiment, therefore, the credit account facility (14*a*) has one player, credit account associated with it, while credit account facility (14*b*) has two associated, but separate, player credit accounts.

The gaming server (2) operates under control of a stored server program (not shown) capable of enabling a predetermined number, say six, of players to play an instance of a multiplayer game that will be referred to, for convenience, as "multiplayer slots". When the number of players reaches this predetermined maximum number, the server program causes a further instance of the game of multiplayer slots to be initiated, the new instance of the multiplayer slots game also being capable of accommodating a further six players. In this manner, the gaming server is capable, under stored server program control, to spawn as many separate instances of the game of multiplayer slots as required in order to accommodate a pool of players who desire to play the multiplayer slots game, in groups of a maximum of six. Each instance of the multiplayer slots game spawned in this manner is treated as totally independent of the other instances of the game.

The online casino websites (3*a*, 3*b*) enable a player who desires to join the game of multiplayer slots to request, by means of one of the computer workstations (4), participation in the game and, once admitted to an instance of the multiplayer slots game, to place wagers and to play in that instance of the game. Each participating player in an instance of the game is presented with an identical graphical user interface ("GUI") on his respective computer workstation (4) by a separate stored program (not shown) in the workstation. The GUI presents to the player, on the display monitor (5), a display of the reels of a five-reel video slots game. It will be appreciated that the game of video slots is, as is well known in the art, essentially a single-player game. The GUI also presents to the player a display of up to five further sets of reels of a five-reel video slots game. These further sets of reels correspond to the instances of the single-player video slots game played by the other participating players in the particular instance of the multiplayer slots game. The other players in the same instance of the multiplayer game use these additional sets of reels only for presentation purposes in order that each participating player can follow the progress of all the instances of the video slots games played. The GUI clearly distinguishes a player's own set of reels, i.e., instance of the single-player game, from those of the other participating players. Each set of reels is identified by a corresponding name, which might be a name assumed by the participating player for participation in the multiplayer slots game, or the participating player's own name.

The stored workstation program (not shown) also enables a participating player to place wagers on and to play the player's own instance of the five-reel video slots game, while the application web server (12) is capable of determining whether any participating player is successful or unsuccessful according to the rules of the multiplayer bonus game. The stored program in the gaming server (2) also maintains a dynamic register (16) of all players admitted to, and actively participating in, all the spawned instances of the multiplayer slots game from time to time, together with data representative of a corresponding portal (3*a*, 3*b*) through which each participating player accessed the multiplayer slots game. The dynamic register (16) also contains data representative of an instance of the multiplayer game in which the player is participating. The application web server (12) also settles the wagers of the participating players after completion of every turn of any instance of the multiplayer game.

Each computer workstation (4) may take the form of a conventional personal computer operating under a Windows XP, ME, 2000 or other operating system, which is well known and commercially available from Microsoft Corporation of Redmond, Wash., or other operating system such as provided by Apple Computer or a Linux operating system. The gaming server (2) operates for example under the Windows NT operating system. The stored workstation program (not shown) and the corresponding stored server program will be referred to, for convenience, as a client process and a server process, respectively. The server process generates one or more random events that determine the outcome of the multiplayer slots game, such as determining the outcomes of spins of the reels in the various single-player video slots games of the participating players. The client process of any particular computer workstation (4) obtains the result of the random events from the gaming server (2), along the communication network (9) and displays the outcome of the game on the display monitor (5) of the workstation in an intelligible manner, by causing the player's set of slots reels to spin and to come to rest at a position corresponding to the outcome. In order to play the game of multiplayer slots from any particular computer workstation (4), the client process (not shown) must first be downloaded to that computer workstation from the gaming server (2) or, alternatively from a separate web server (not shown), and then installed on the workstation.

In use, a player wishing to participate in the game of multiplayer slots uses a computer workstation (4) to access an online casino website (3*a*, 3*b*) of his choice. A flow diagram outlining the steps required in order for a player to participate in an instance of the game is indicated in FIG. 2. The player is presented with an icon (not shown) on the GUI on his computer workstation (4), which the user can activate in order to request participation in the multiplayer slots game. The user's request for participation (100) is passed by the online casino website (3*a*, 3*b*) to the gaming server (2), which adjudicates and processes the request in the following manner:

1. if all existing instances of the multiplayer slots game are currently being played by 8 players, the existing instances of the game are all fully occupied and the would-be player cannot be admitted to any instance of the game (101). The user is notified of the situation and prompted to join a waiting list of would-be players (102);
2. if any one of the existing instances of the multiplayer slots game does have a vacancy, the would-be player is admitted to that instance of the game (103) or, if previously on the waiting list, is removed therefrom and admitted to that instance of the game. An appropriate multiplayer slots GUI is presented to the newly-admitted player (at 104) to allow him to play the game and to place wagers thereon;
3. the register of active participating players is updated (at 105) to include the details of the newly-admitted player, together with data representative of the online casino from which the player was admitted to the game, as well as the particular instance of the game to which he has been admitted;
4. when the waiting list of would-be players has grown sufficiently large, say 3 or 4 would-be players (106), the gaming server spawns a new instance of the game (107) to accommodate the would-be players in the waiting list, and the list is flushed (108); and
5. the register of active participating players is updated (105) to include the details of all the newly-admitted players in the newly-spawned instance of the game, together with data representative of the online casino from which the players were admitted to the instance of the game, as well as the particular instance of the game to which the players have been admitted.

Any player is able to leave the instance of the multiplayer slots game in which he is participating at any time. A flow diagram outlining the steps required for a player to leave an existing instance of the game is outlined in FIG. 3. When a participating player leaves an instance of the multiplayer slots game (200), the player's departure results in the system (1) undertaking the following actions:

1. the GUI corresponding to the multiplayer slots game on the computer workstation is replaced by one allowing the player to select another casino game to play (201);
2. the departing player's details are removed from the register of active participating players (202); and
3. the remaining instances of the game are analyzed in order to collapse any sparsely populated instances of the game and to consolidate the participating players in these instances into a single more densely-populated instance of the game (203).

The wagers placed by the players participating in the multiplayer slots game are made with credit purchased by such players prior to their participation in the game. For this purpose, each online casino (3*a*, 3*b*) includes credit-dispensing means (not shown) capable of dispensing credit to any player who wishes to participate in the game. The player may purchase credit by means of conventional credit or debit card payment facilities that are well known in the art and which will not be described here in detail. Whenever a player purchases credit from the credit-dispensing means, the corresponding online casino (3*a*, 3*b*) credits that player's credit account with an amount equivalent to the quantity of credit purchased by the player.

It will be appreciated by those skilled in the art that the above embodiment permits implementation of a multiplayer game out of separate instances of a traditionally single-player game played by each one of a plurality of players.

The multiplayer gaming system (1) need not be an on-line embodiment as described above, but may, for example, be an embodiment suitable for deployment in a land-based establishment such as a casino. In this instance, the multiplayer gaming system (1) may be deployed as a bank of adjacent player stations, such as in the form of video terminals, each linked to the administration facility (12) by means of a local area network.

It is not necessary or essential that the gaming server (2) maintain a waiting list of would-be players from which players are admitted to vacant playing positions in existing instances of the multiplayer game, and according to which new instances of the multiplayer game are spawned when all existing instances are fully occupied. As an alternative, a desired number of instances of the game may be spawned ab initio, with players able to enter and leave any instance of the multiplayer game at will, thereby dispensing with the waiting list altogether. It is also not necessary for separate sparsely-populated instances of the multiplayer game to be collapsed to consolidate participating players in these instances of the game into a single more densely-populated instance of the multiplayer game. Sparsely populated instances of the multiplayer game will function as effectively as fully populated ones. The online casino websites (3*a*, 3*b*) need not offer the players other casino games for play.

Additionally, each spawned instance of the multiplayer game, or slots room, may be uniquely identified or named, with naming rights being awarded to participating, players who are deemed to be "high rollers," thus increasing the attractiveness of the system (1) to prospective players. A high roller may also rent one or more slots rooms from an operator of the multiplayer gaming system (1), with revenue arising from the slots rooms being shared between the operator and the high roller. This mode of operation provides an incentive to the high roller to promote his slots rooms and to create virtual slots communities in order to maximise revenue therefrom.

It is also possible for the highest-ranking outcome of the single-player game to be linked to a payout that is a progressive jackpot, incremented by a proportion of each player wager.

Still further, the functions of the gaming server (2) and the application web server (12) may be consolidated and performed by a single processor. The application web server (12) can be arranged to monitor the individual credit account balances of the participating players at the online casino websites (3*a* and 3*b*) and to cause the gaming server (2) to terminate participation in the game of any player whose credit account balance drops below a predetermined minimum threshold. Yet further, the administration facility may also require each clearing account associated with an on-line casino website to exceed a prescribed minimum balance at all times, and for the administration facility (12) to terminate participation in the game of all players who have accessed the game through an online casino website whose associated account balance falls below the prescribed minimum balance. Yet further, the credit dispensing means (not shown) may be a centralized credit dispensing means, instead of a distributed one available through each online casino website (3*a*, 3*b*). Finally, a portal need not be an online casino website where a variety of different games are offered to a player, but rather a slots room where multiplayer slots is the only game available to would-be players.

The embodiment disclosed above enables implementation of a multiplayer game, such as that mentioned above, which is based on traditionally single-player games, drawing and pooling players from different, possibly competing, entities such as online casinos or other groups such as sports betting organizations and the like. The illustrated embodiment performs dynamic load management by spawning new instances of the multiplayer game and collapsing and merging sparsely populated instances of the game to accommodate changing levels of player demand. The above embodiment therefore provides a novel apparatus and method for establishing and conducting the progress of a multiplayer game that is based on multiple instances of a traditionally single-player game played by each one of a plurality of players.

Multiplayer Bonus Game

As noted above, one aspect of this disclosure is a bonus game aspect of the single-player wager game, in which the timing of the play of the bonus game is triggered randomly by the gaming server. One example of this bonus game will now be described in conjunction with the screen shots of FIGS. 4-12.

Figure 4:
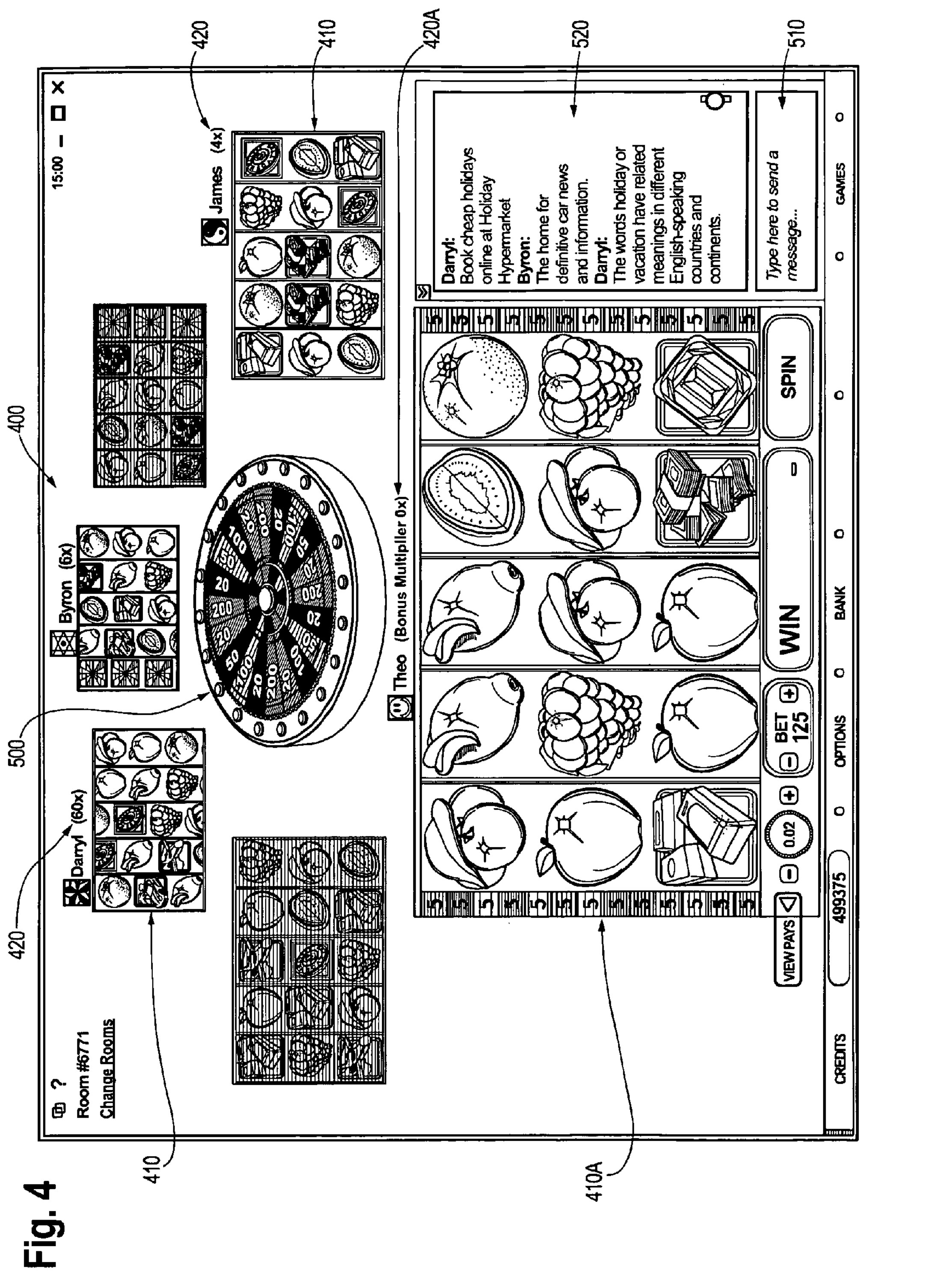
FIG. 4 an illustration of a multiplayer video slots room displayed on a gaming workstation wherein four players are currently active. The display on the workstation shows not only the player's own video slot game instance (located in the bottom center of the game area of the display), but also simultaneously a display of the outcome of three further game instances of the video slot game showing play occurring at different workstations.

FIG. 4 is a screen shot displayed on the display (400) of a gaming workstation (4) when they have logged into a casino website (3) (FIG. 1). The display (400) represents a slot room that includes a display of six sets of video slot reels (410). Each set of video slot reels in the slot room represents a separate instance of a single-player game played by a player on a separate gaming workstation (4). In this example the single-player game is five-reel video slots. The reel set (410A) in the bottom half of the display relates to the subject player using the workstation, while the remaining reel sets represent action occurring on separate workstations, such display being for presentation purposes only and the player operating the instant workstation does not wager on the outcome of play on these reel sets. In other words, each workstation plays a separate instance of a video slots game, but all the players are grouped or aggregated together such that each player views the action occurring on each of the other instances in the group (up to six in this example) in order to simulate a casino experience.

Two of the reel sets are shown as "greyed out", which means that they are not currently in use, i.e. there are currently two vacant instances of the single-player game in the slots room. The remaining four sets of video slot reels are active. As mentioned above, each active player is operating a separate gaming workstation. The players need not all be registered with the same casino web site. In particular, they could be registered via any casino web site that communicates with the central gaming server (2) and can be logically grouped by the central gaming server into players playing at a given slot room.

Each active instance (410) of the single-player game has the player's name (or screen name) appearing above the reels. The reels (410A) of the subject player are associated with the name "Theo", while the other active players are identified by the names "Darryl", "Byron" and "James". Adjacent each name is a display of accumulated multiplier credit (420) (either zero or a positive integer), the function of which will be described in the description that follows. The subject player, Theo, has a multiplier credit (420A) of zero, while players Darryl, Byron and James have multiplier credits (420) of 50, 5 and 4, respectively.

Briefly, the single-player wager game (in this example video slots) features a pay table in which one of the possible rewards for a turn of play of the single-player wager game is an award of multiplier credit which is useable in the bonus game. The amount of multiplier credit the player could accumulate in a given turn of the instance of a game depends on the number of coins wagered on that turn, and the number of "bonus multiplier credit" symbols (e.g., gold coins, or other symbol) that occur on the pay line after a turn of the game. For example, with a wager of one coin, if two of such symbols occur, the player is awarded one multiplier credit. If three of such symbols occur, the player is awarded three multiplier credits. If four of such symbols occur, the player is awarded thirty multiplier credits. If five of such symbols occur, the player is awarded three hundred multiplier credits. If a player wagers say two coins instead of one, the awards of multiplier credit would be double those just stated. This is, of course, just one possible example of a pay table for a slots game featuring awards of multiplier credit, and the details of the pay table can vary widely from this example without departure from the scope of the invention.

Figure 5:
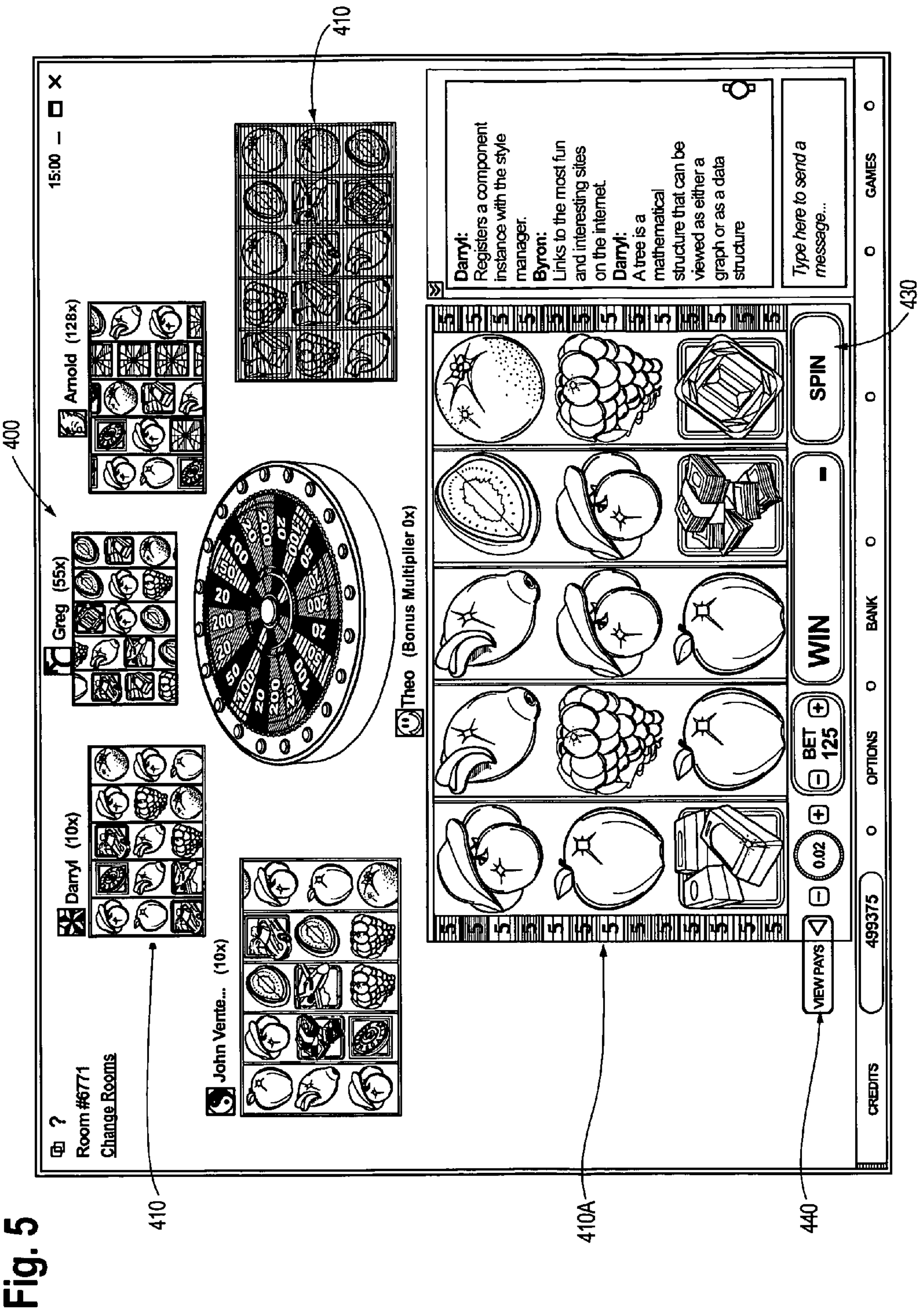
FIG. 5 is an illustration of the multiplayer video slots room of FIG. 4 wherein two players have left the slots room and three additional players have joined the slots room and there are now five players that are currently active. The display on the workstation shows not only the player's own video slot game instance (located in the bottom center of the game area of the display), but also simultaneously a display of the outcome of four further game instances of the video slot game occurring on four other gaming workstations.
Figure 6:
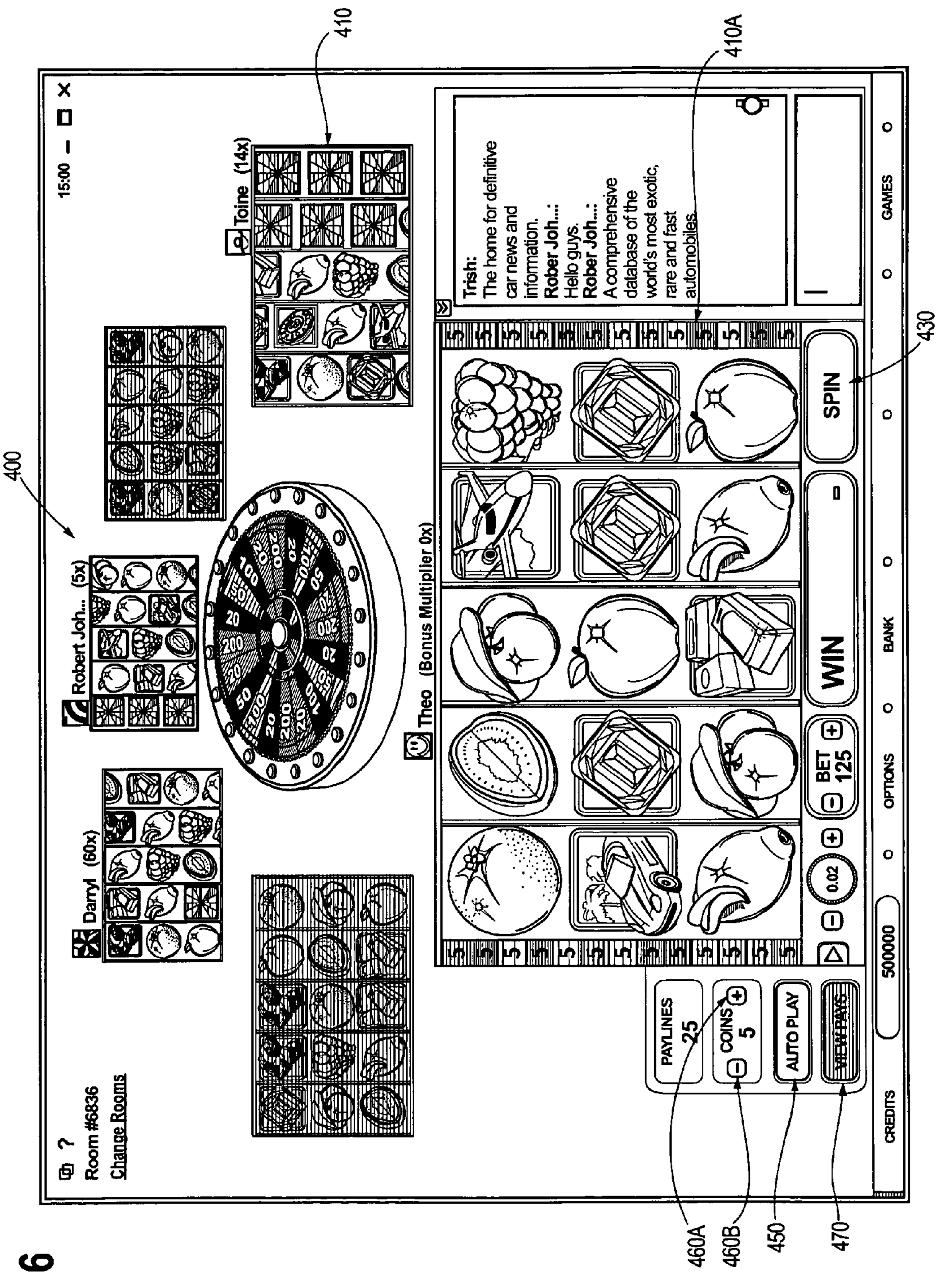
FIG. 6 is a further illustration of the multiplayer video slots room of FIG. 4.

Participating players can leave the slot room at any stage during the multiplayer game, in which case their instance of the single-player game in the slot room becomes unoccupied and will be displayed to the remaining players as greyed out until such time as that game instance in the slot room is occupied again by the same or a different player. If the player leaves the slots room, they lose any accumulated multiplier credit. This is illustrated in FIG. 5, which is a further screen shot of the display (400) on the gaming workstation of player Theo, although subsequent to that of FIG. 4, after some further game play has taken place. Only one of the reel sets (410) is now shown as greyed out, i.e. unoccupied. There are now five active participating players. Players "Byron" and "James" have since left the slot room, while new players "John Vente", "Greg" and "Arnold" have joined the slot room.

Figure 7:
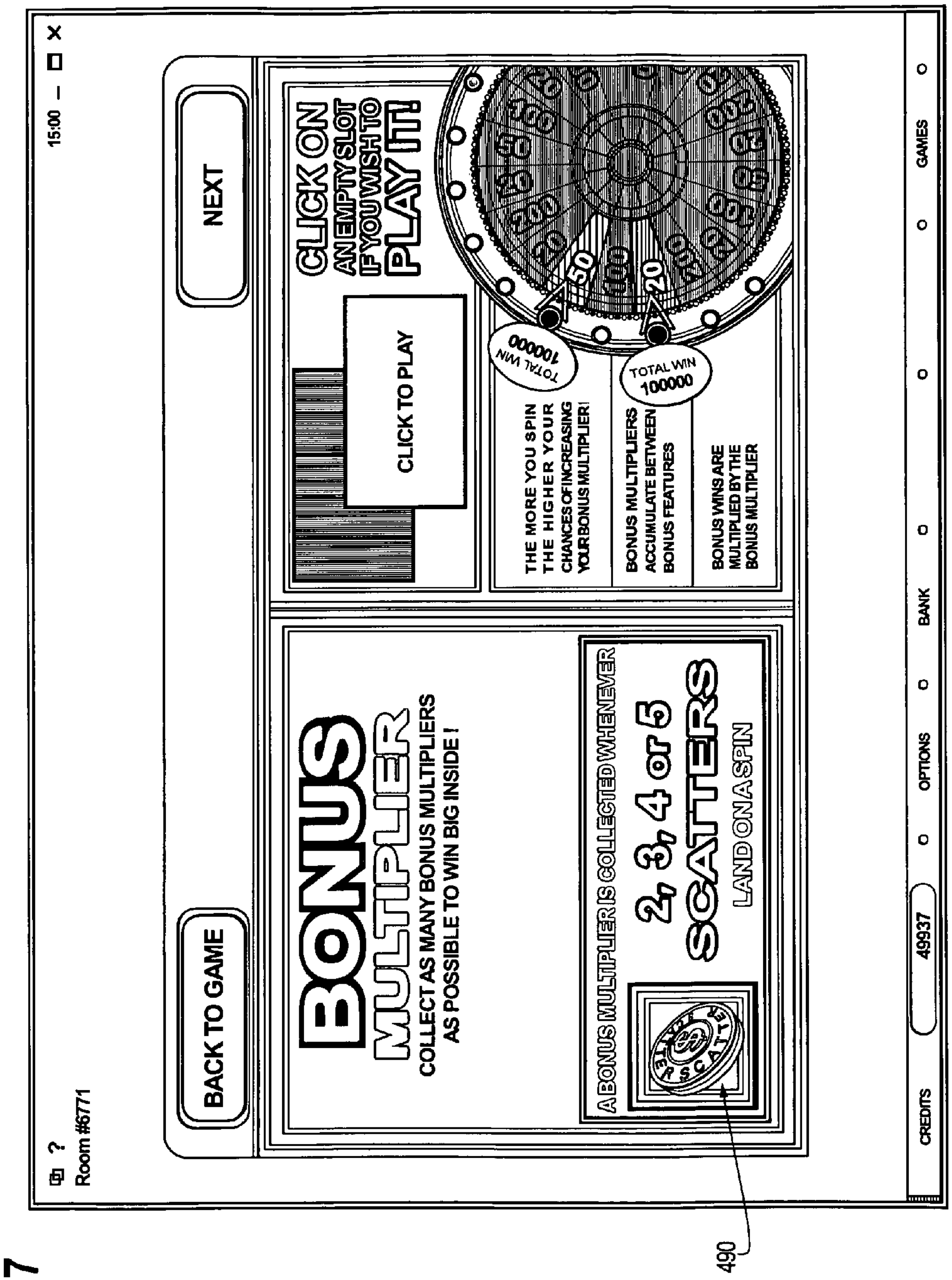
FIGS. 7, 8 and 9 are illustrations of partial pay tables of the video slot game of the multiplayer video slots room of FIG. 4.
Figure 8:
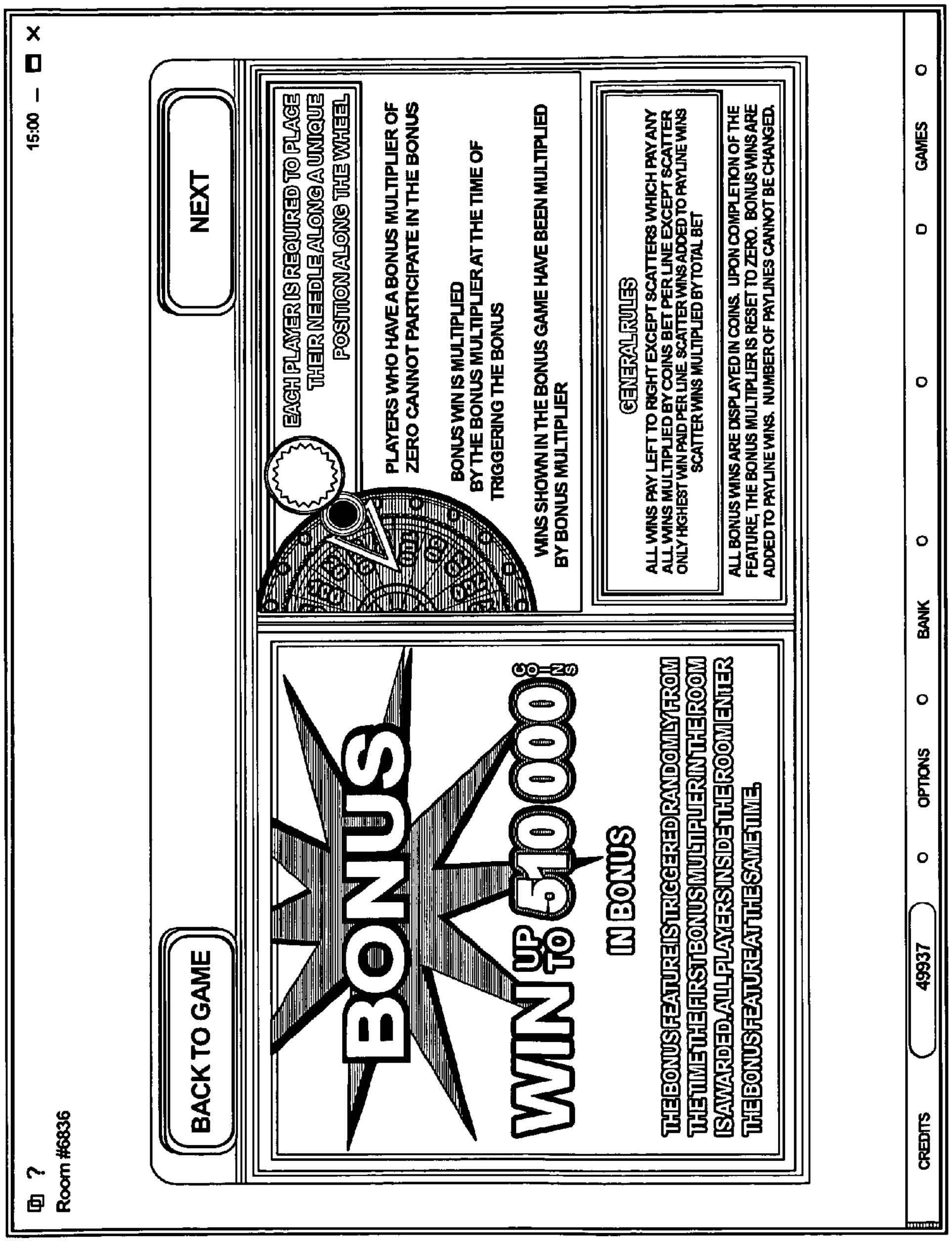
Figure 9:
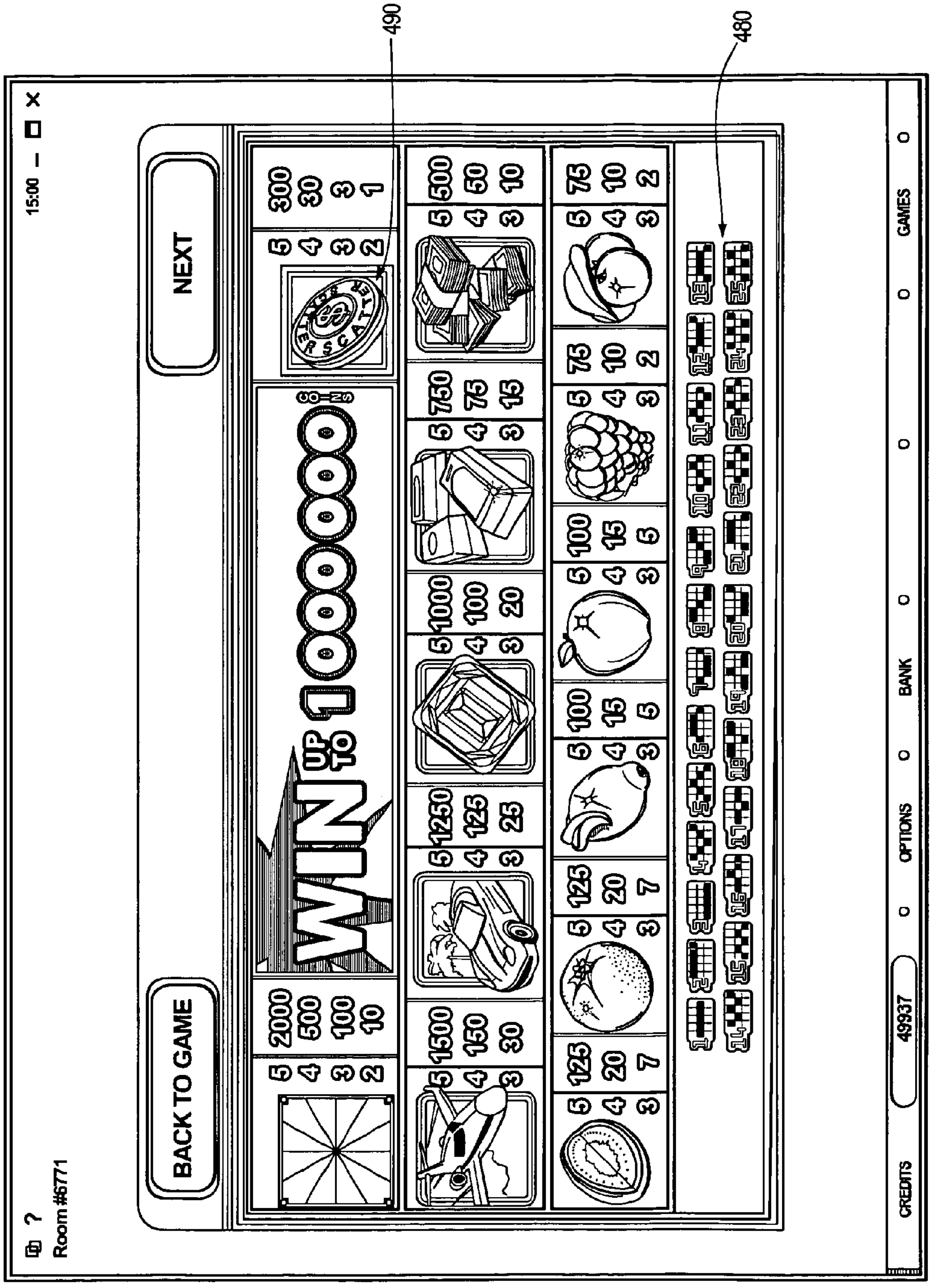

Each set of video slot reels (410) represents a separate instance of a five-reel, 25-line video slot game. The icons at the bottom of the subject player's instance (410A) of the video slot game provide several functions. The SPIN icon (430), when activated, allows the player to manually control the spin of the video slot reels. The VIEW PAYS icon (440) reveals further icons, namely:

a) an AUTOPLAY icon (450) that, when activated, allows the instance of the video slot game to automatically spin without requiring specific player input. This feature speeds up the action;

b) COINS+ (460A) and COINS-- (460B) icons that enable the subject player to adjust the size of wagers by selecting the number of coins to be wagered per payline, in a range from 1 to 20; and c) A VIEW PAYS icon (470) that displays on the display 400 a pay table associated with the video slot game, as shown in FIGS. 7-9.

FIGS. 7-9 represent, collectively, a pay table of the present example of a single-player wager game in the form of a five-reel video slot game. The symbols appearing on the reels of the game and their associated payouts are represented in FIG. 9. FIG. 9 also shows the geometry (480) of the 25 paylines of the game. The pay table indicates that the game symbols includes a scatter symbol (490) associated with an award of a multiplier credit, represented by the coin symbol (490). With reference to FIGS. 7 and 9, whenever two or more scatter symbols (490) appear on an active payline of the video slot game, the player's multiplier increases according to the following table:

| Scatter Symbols | Multiplier Credit |
|---|---|
| 2 | 1 × Coins wagered/line |
| 3 | 3 × Coins wagered/line |
| 4 | 30 × Coins wagered/line |
| 5 | 300 × Coins wagered/line |

It will be appreciated that the rate at which a player's multiplier credit increases is in direct proportion to the amount wagered by the player on the video slot game. Each player's multiplier credit is set to zero at the commencement of a playing session.

Figure 10:
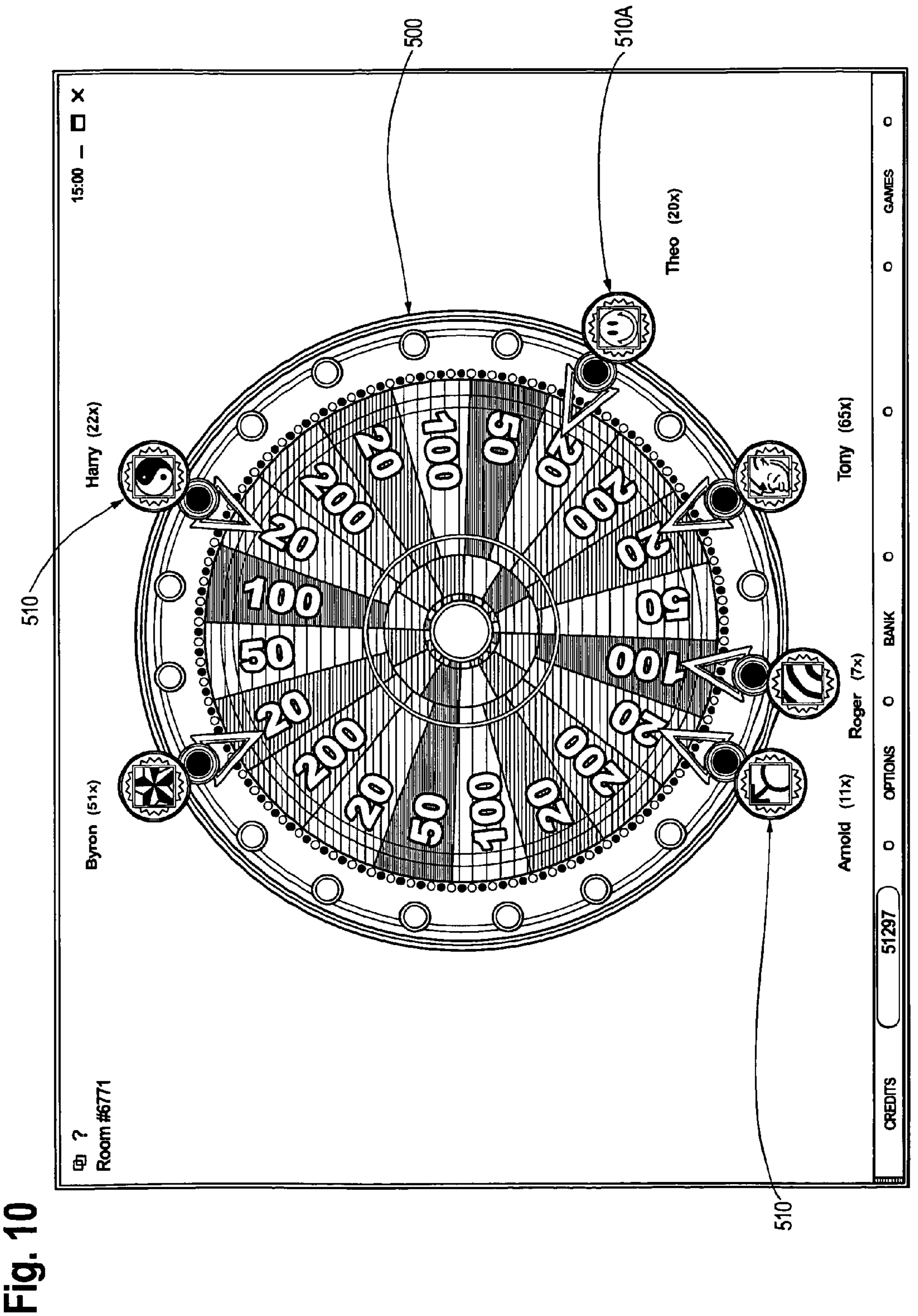
FIG. 10 is an illustration of a multiplayer bonus game available to players participating in the multiplayer video slots room of FIG. 4, with the bonus game featuring a bonus machine in the form of a spinning wheel.

Returning now to FIG. 4, the display (400) includes a display of a multi-sectored bonus machine or device, in this example in the form of a wheel (500), each sector or spoke on the bonus wheel having a corresponding wheel multiplier consisting of a positive, non-zero integer. The bonus wheel (500) is used in conjunction with each participating player's respective multiplier credit (420) to implement a multiplayer bonus game according to the following rules.

a) The multiplayer bonus game is triggered randomly at any time after a first one of the players participating in the slot room obtains a non-zero multiplier credit (420) as described above.

b) At this stage, play of all instances of the single-player game in the slot room is suspended temporarily and the multiplayer bonus game commences.

c) The display (400) of the reel sets (410) on the gaining machine (4) is replaced by a display of the bonus wheel (500) as shown in FIG. 10.

d) Each player in the slot room with a non-zero multiplier credit (420) is eligible to participate in the multiplayer bonus game. Any player in the slot room with a zero multiplier credit does not participate and is merely an observer of the multiplayer bonus game.

e) Each player with a non-zero multiplier credit (420) is allocated a pointer (510) that is positioned randomly around the circumference of the bonus wheel (500). Alternatively, the player is given the opportunity to select a position around the periphery of the bonus wheel.

f) The bonus wheel (500) then spins, slows and finally comes to rest.

g) Each participant in the multiplayer bonus game is then assigned a result in the form of a multiplier (integer value) that appears on a sector or spoke of the bonus wheel (500) opposite that player's pointer (510).

h) Each participant in the multiplayer bonus game wins a bonus amount equal to the product of that player's accumulated multiplier credit upon entering the bonus game multiplied by the wheel multiplier (result) awarded to the player.

i) The bonus amounts are credited to the respective players' credit accounts.

j) Each player's multiplier credit is then re-set to zero.

k) The display of the bonus wheel (500) is replaced by the display (400) of the reel sets and play of all previously-active instances of the single-player game in the slot room resumes.

The astute reader may notice that the multiplier credit accumulated by a player will depend on the coin size the player wagers during the play of the single-player game prior to the initiation of the bonus game, and the accumulation of any positive integer value of multiplier credit is theoretically possible. Whatever multiplier credit that a player may have accumulated at the moment the bonus game is triggered is used to determine the bonus award (award=bonds result X accumulated multiplier credit). The multiplier credit accumulated by a player can only go up, i.e., the credit is not subject to diminution due to slowing down of play or a brief pause in play by the player, as in some prior art games. As noted in step j) above, after the bonus game is over, the player's accumulated multiplier credit balance is reset to zero and another cycle of play commences.

As each player in the slot room plays the multiplayer game, the central server (2) sends update datagrams indicating the outcome of play, i.e., of each spin of the video slot game. This is true not only for the instance of the game being engaged in via the workstation (the action reflected in slot machine reel (410A)); but also for the reel sets (410) of the other player(s) currently active in the slots room. Thus, in the example of FIG. 4, the central gaming server sends data to the workstation comprising the outcome of further instances of the single-player game (the result of play of reels (410), played by Darryl, Byron and James, respectively), the further instances being additional instances of play of the single-player game being engaged in substantially simultaneously via other workstations (workstations used by Darryl, Byron and James). Consequently, as play progresses, the workstation may simultaneously display on its display the outcomes of play of the instances of the single-player game being engaged in by both the instant workstation and the other workstations, as indicated in FIG. 4.

In a preferred embodiment, Darryl's workstation also displays his own gaming action as well as the gaming action of the workstations of Byron, James and Theo. In other words, all players in the slots room view the results of play of their own instance of the game, as well as the results of play of all the other instances of the single-player game in the grouping of workstations forming the slots room. Thus, all the players enjoy the same casino-like experience of watching all the play occurring in the video slots bank. To achieve this result, the server process executing in the central gaming server (2) sends datagrams containing the results of play of all the instances of single-player games in the group of workstations, and the local client applications resident on the workstations use such results in the datagram to present virtual slot machine reels on the display of the workstation displaying the results.

FIG. 4 illustrates a chat or instant messaging feature that is provided in the display. Any time a player wishes to send a comment or message to the other players in their slot bank, they move their cursor to a text dialog box (510) and click, and type in a message and then hit <ENTER>. The client application encapsulates the comment in a datagram and then transmits the datagram to the central gaming server. The datagram is transmitted to all the workstations in the slots room. The local client application displays the text file (including the instant message) in the text listing window (520).

To further simulate a casino environment, in addition to seeing the play of the other slot machines and provide a facility for chatting back and forth, the illustrated embodiment further may optionally provide for sound effects. In particular, the server process transmits data to the workstations associated with sound effects that are intended to be played on the workstation. The sound effects can consist of sound files, such as .wav files (or some other compressed or uncompressed sound file format, the details of which are not important), or as one or more bits or flags that indicate which of previously stored available sound effects files should be played on the workstation. In the latter example, at some prior point in time the workstation will have downloaded a set of sound files and stored them locally on the hard disk memory of the workstation. Then, when a given flag is received, the gaming application executing on the workstation will select a specific audio file from the set and have it played by a media application present on the workstation.

There are a variety of possible sound effects that can be provided to the workstations. These include sound simulating casino background noise (e.g., faint music, talking, game sounds, etc.,) which could be recorded from an actual casino. Another sound could be sound simulating operation of a gaming machine, such as spinning or other machine sounds that are made by a typical slot machine in a land-based casino. As a further example, the sound could simulate a voice reaction related to an outcome of the play of the single-player game being engaged in at one of the other workstations. For example, if a player won at slots, the central server could send a datagram containing celebratory sounds, hooting and hollering, cheers, etc. The voice reaction could be commensurate with the amount of the win, for example. The vocal sound effects could be in either male or female voice, depending on the sex of the player that won.

Considering the total cumulative effect of the sound effects, the instant messaging feature, and the visual display of multiple players' gaming activity simultaneous with the player's own game playing, the total gaming experience provided in this disclosure is significantly enhanced.

When the central gaming server (2) randomly triggers the multiplayer bonus game, the server sends a notification datagram to each active gaming machine (4) in the slots room, together with data identifying all players in the slots room that are eligible to participate in the multiplayer bonus game and the positions of pointers of the participating players on the circumference of the bonus wheel (500). The local client application resident on the workstations use such data to render a display of the bonus wheel (500) on the display of each workstation in the slots room and to position the pointers of the players on the circumference of the bonus wheel, as shown in FIG. 10. In this example, the slots room is fully occupied and all six players have qualified to participate the multiplayer bonus game by having non-zero multipliers credit (420). The subject player, Theo, has a multiplier credit (420A) of 20. During play of the single-player wager game, the multiplier credit for the players accumulates during a period prior to the triggering of the bonus game by the gaming server and is not subject to decrease during this period, for example, due to change in the rate of play or a temporary interruption of play by the player, e.g., to make a phone call or obtain refreshment.

Figure 11:
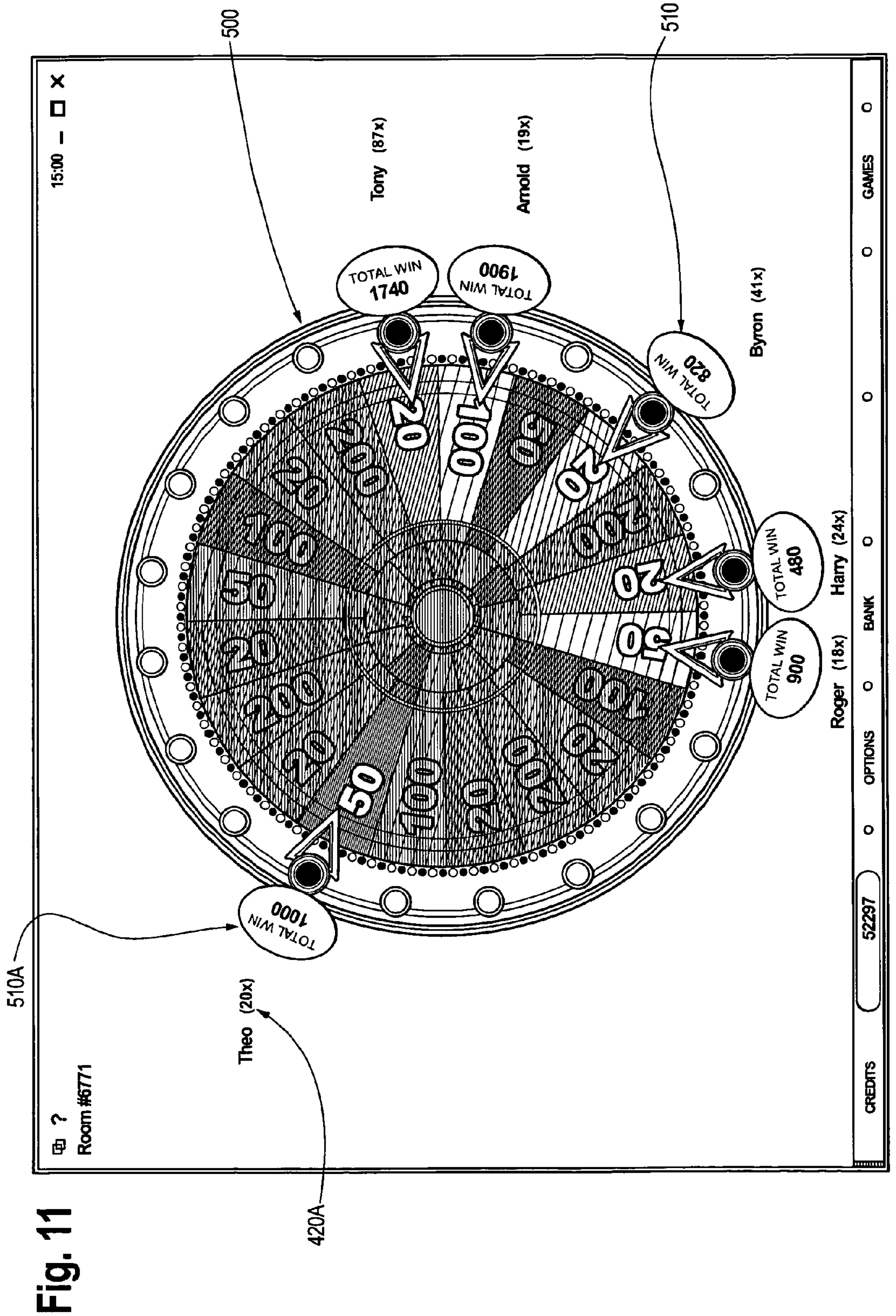
FIG. 11 is an illustration of the multiplayer bonus game of FIG. 10 after completion of an iteration of the multiplayer bonus game.
Figure 12:
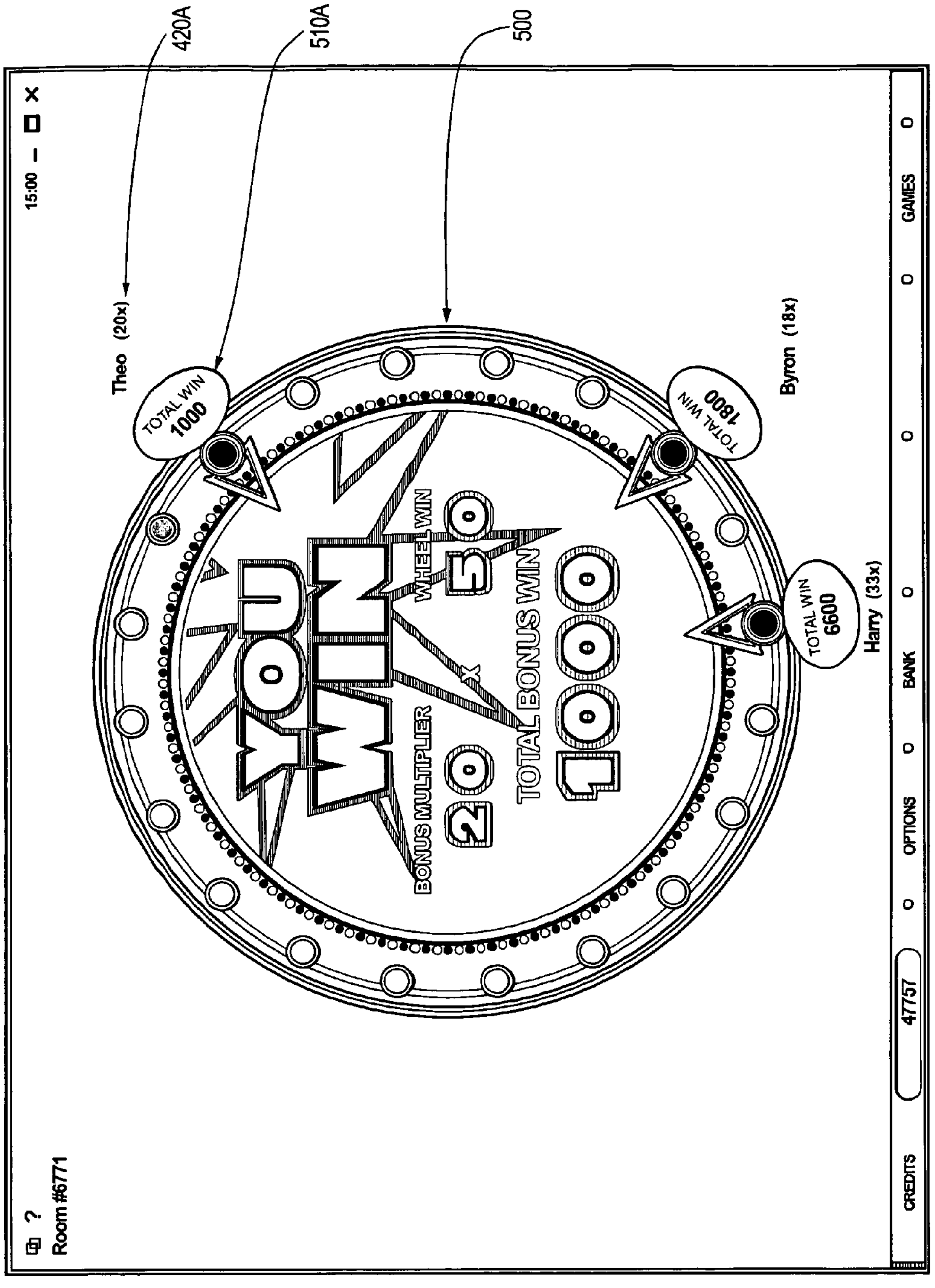
FIG. 12 is an illustration of a win notification to the player after participating in an iteration of the multiplayer bonus game of FIG. 10.

In the example of FIG. 11, six players in the slots room have again participated in the multiplayer bonus game and the bonus wheel has come to rest as previously described. Each of the players that participated in the multiplayer bonus game wins an amount equal to that player's accumulated multiplier credit upon entering the bonus game multiplied by the multiplier (result) appearing on the bonus wheel sector or spoke opposite that player's pointer. In FIG. 11, for example, the subject player, Theo, entered the bonus game with a multiplier credit (420A) of 20 and the multiplier (result) on the bonus wheel sector opposite Theo's pointer is 50. Thus, Theo's win amount is 20×50=1000 (coins). FIG. 12 illustrates a notification message to the subject player that he has won an amount of 1000 in a turn of the multiplayer bonus game.

It will further be noted that player participating in the bonus game obtains the winnings in the bonus game from the proprietor of the game and their winnings are independent of results for other players participating in the bonus game and are not shared with such other players.

While the illustrated example of the bonus game of FIG. 10 features a spinning wheel, this is not necessary and the format for the bonus game can vary. In general, the bonus game is characterized by a generating for each player participating in the bonus game a result, in which the result is generated randomly from the set of finite possible outcomes. The winnings in the bonus game for a player participating in the bonus game is the product of the player's multiplier credit multiplied by the result. This result, typically an integer value such as 20, 100, 200, can be generated by a random number generator (e.g., in a computer) and the generated result displayed to the players in any suitable fashion, for example by the spinning of a wheel.

Figure 13:
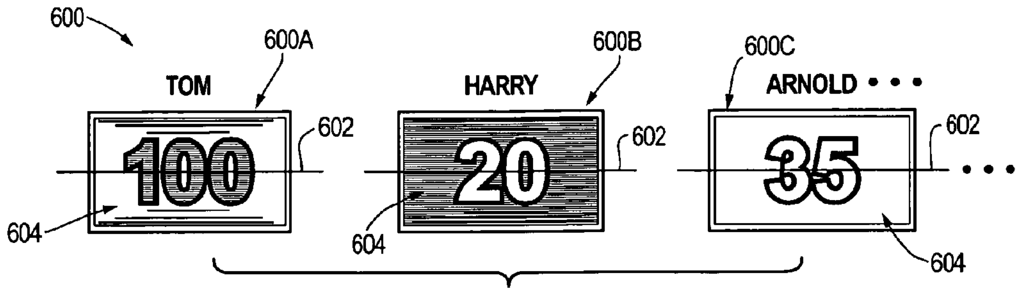
FIG. 13 is an illustration of an alternative embodiment of a bonus machine in the form of one or more reels, the reel(s) having indexed positions with integers (bonus game multiplier) and a single pay line.

FIG. 13 shows another possible example of how the result could be generated by what is referred to herein as a "bonus machine," item 600. Each player participating in the bonus game is assigned a bonus machine in the form of a slot machine reel 600A, 600B and 600C. The slot machine reels consist of a finite number of indexed positions, each position bearing an integer number such as 10, 20, 100, etc. The reel includes a pay line 604. When the bonus game is played, the reels 600A, 600B and 600C spin and come to rest, with the indexed position 604 landing under the payline being randomly determined. In this example, player TOM has a result of 100, player HARRY has a result of 20 and player ARNOLD has a result of 35. TOM'S award in the bonus game is 100 times the multiplier credit he had accumulated at the time the bonus game was triggered.

Figure 14:
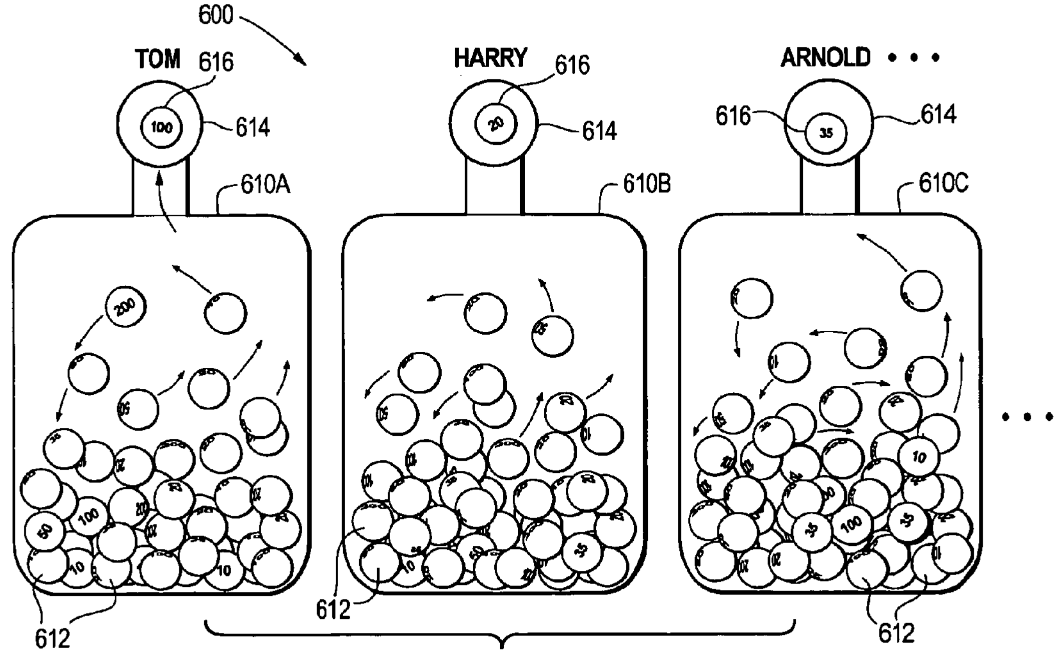
FIG. 14 is an illustration of an alternative embodiment of a bonus machine in the form of a device randomly selecting a numbered ball, with the bonus win for a player being the product of the number appearing on the ball multiplied by the players' accumulated multiplier credit.

FIG. 14 is another example of a bonus machine 600 in the form of one or more devices 610 which randomly select a numbered ball 612 from a finite set of numbered balls bouncing around inside the device 610. Each player participating in the bonus game is assigned their own device 610, hence the outcomes for each player are independent of each other. Player TOM was randomly awarded a ball bearing the number 100. Player HARRY was randomly awarded a ball bearing the number 20. Player ARNOLD was randomly awarded a ball bearing the number 35. It will be appreciated that the bonus machine 600 of FIG. 14 could take the form of a single device 610, with the players taking turns, and the ball selected for the previous player re-introduced into the device 610 so that the results for each player are completely independent. Additionally, in a completely electronic version of the bonus game, the bonus machine 600 is virtual, whereas in a physical embodiment the bonus machine may take the form of a physical machine, such as a for example a physical wheel that spins, a set of physical slot machine reels, or a machine which randomly selects a physical ball bearing a number, like those used in Lotto games. In the embodiment of FIG. 14, the bonus winning for a player playing the bonus game is the product of the number appearing on the player's selected ball multiplied by the player's accumulated multiplier credit at the moment the bonus game is triggered.

Figure 15:
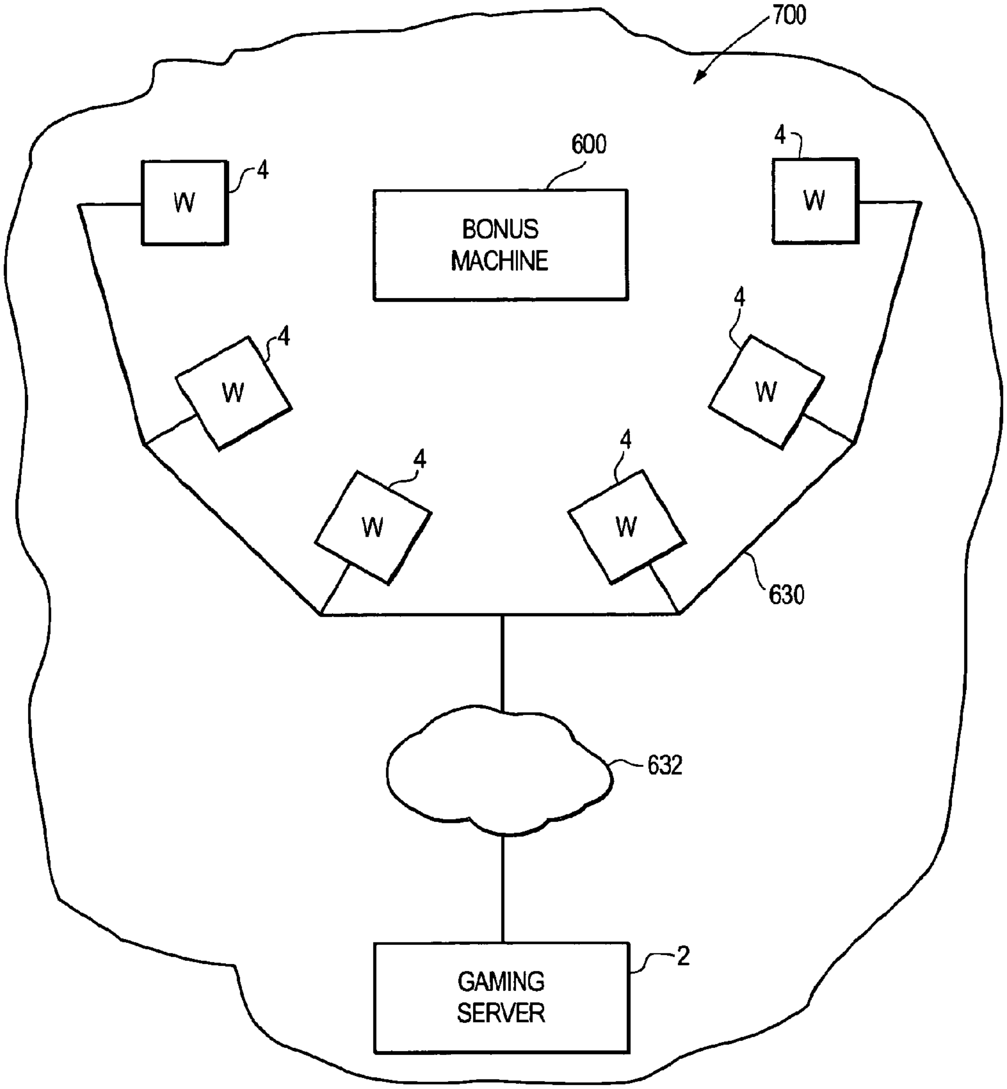
FIG. 15 is an illustration of one possible configuration of a casino having the multiplayer game features of this disclosure, in which the bonus machine of FIG. 15 could take the form of a physical wheel akin to the wheel shown in FIG. 10, one or more reels as shown in FIG. 13, or one or more of the ball selection devices of FIG. 14.

FIG. 15 is an illustration of a game room 700 which may be present in a physical casino in which the instant games are played. The game room 700 consists of a group of workstations W (4) clustered around a bonus machine 600 which can take one of the forms described above, or some other form. The workstations 4 are each coupled over a local area network 630/632 which is connected to a central gaming server 2. The gaming server 2 functions to generate results of play and transmit datagrams to the workstations 4 so as to allow each player to view not only their own game action but also the game action of the other players. When the bonus game is triggered (as described above), the play of the single-player wager game is temporarily suspended and the bonus game commences. The play of the bonus game is conducted via the bonus machine 600, either in a completely automated fashion or with the aid of an assistant (e.g., to spin a wheel, spin a slot machine reel, or select a ball from a machine). The players participating in the bonus game receive their winnings from the bonus game (e.g., in cash, chips, or credit) and play reverts back to the single-player wager game for another round of game action.

While a number of exemplary aspects and embodiments have been discussed above, those of skill in the art will recognize certain modifications, permutations, additions and sub-combinations thereof are present in the disclosure. It is therefore intended that the following appended claims and claims hereafter introduced are interpreted to include all such modifications, permutations, additions and sub-combinations as are within their true spirit and scope.

We claim:

1. A gaming server comprising:

a central processing unit and a memory storing program instructions for execution by the central processing unit, the central processing unit generating results of play of multiple instances of a single-player wager game, wherein the multiple instances are aggregated into a multiplayer gaming environment;

wherein the multiple instances are played by multiple players each using workstations communicating with the gaming server over a communications network;

wherein, the single-player wager game features a pay table in which one of a plurality of possible rewards for a turn of play of the single-player wager game is an award of a multiplier credit useable in a bonus game aspect of the single-player wager game;

wherein the gaming server is operative to randomly initiate the play of a bonus game wherein during play of the bonus game, play of all of the aggregated instances of the single-player wager game is temporarily suspended;

wherein the bonus game is only played by those players having accumulated at least one multiplier credit prior to the initiation of play of the bonus game by the gaming server;

wherein multiplier credit for the players accumulates during a period prior to a triggering of the bonus game by the gaming server and is not subject to decrease during said period due to a change in a rate of play or temporary interruption of play by the players; and wherein the bonus game is characterized by a result for each player participating in the bonus game randomly generated from a set of finite possible outcomes, and winnings in the bonus game being the product of the multiplier credit multiplied by the result, whereby a player participating in the bonus game obtains the winnings in the bonus game from the game's proprietor and the player's winnings are independent of results for other players participating in the bonus game and are not shared with such other players.

2. The gaming server of claim 1, wherein the bonus game is further characterized by a spinning of a wheel having a multitude of spokes, each spoke being assigned a result in the form of an integer wheel multiplier, with a player participating in the bonus game winning an amount equal to the player's accumulated multiplier credit upon initiation of the play of the bonus game multiplied by the wheel multiplier for the spoke of the wheel that comes to a rest in a position around the periphery of the wheel which is associated with the player.

3. The gaming server of claim 1, wherein the single-player wager game comprises a video slots game.

4. The gaming server of claim 3, wherein the video slots game comprises a five reel slots game having a multitude of pay lines.

5. The gaming server of claim 4, wherein the pay table comprises a table of credit awards for particular combinations of symbols appearing on one or more pay lines, the pay table further comprising awards of multiplier credits awarded to the player for an occurrence of two or more like symbols associated with bonus game multiplier credit appearing on the one or more pay lines.

6. The gaming server of claim 4, wherein the workstations and the gaming server are implemented in a physical casino environment.

7. A casino, comprising:

a gaming server and a plurality of workstations in the form of video slots machines, the gaming server comprising:

a central processing unit and a memory storing program instructions for execution by the central processing unit, the central processing unit generating results of play of multiple instances of a single-player wager game, wherein the multiple instances are aggregated into a multiplayer gaming environment;

wherein the multiple instances are played by multiple players each using said workstations, said workstations communicating with the gaming server over a communications network;

wherein, the single-player wager game features a pay table in which one of a plurality of possible rewards for a turn of play of the single-player wager game is an award of a multiplier credit useable in a bonus game aspect of the single-player wager game;

wherein the gaming server is operative to randomly initiate the play of a bonus game wherein during play of the bonus game, play of all of the aggregated instances of the single-player wager game is temporarily suspended;

wherein the bonus game is only played by those players having accumulated at least one multiplier credit prior to the initiation of play of the bonus game by the gaming server;

wherein multiplier credit for the players accumulates during a period prior to a triggering of the bonus game by the gaming server and is not subject to decrease during said period due to a change in a rate of play or temporary interruption of play by the players; and wherein the bonus game is characterized by a result for each player participating in the bonus game randomly generated from a set of finite possible outcomes, and winnings in the bonus game being the product of the multiplier credit multiplied by the result, whereby a player participating in the bonus game obtains the winnings in the bonus game from the game's proprietor and the player's winnings are independent of results for other players participating in the bonus game and are not shared with such other players.

8. The casino of claim 7, further comprising a bonus device in the form of a wheel which is displayable on screen displays of the workstations.

9. The casino of claim 7, further comprising a bonus device in the form of a physical wheel, and wherein the workstations are physically arranged around the periphery of the wheel.

10. The gaming server of claim 1, wherein the network comprises the Internet.

11. A multiplayer wager game apparatus comprising:

a bonus device randomly generating a result from a set of finite possible outcomes;

a plurality of workstations;

a gaming server in communication with the plurality of workstations over a communications network, the gaming server including a central processing unit and a memory storing program instructions for execution by the central processing unit, the central processing unit generating results of play of multiple instances of a single-player wager game played by the plurality of workstations;

wherein, the single-player wager game features a pay table in which one of a plurality of possible rewards for a turn of play of the single-player wager game is an award of a multiplier credit useable in a bonus game aspect of the single-player wager game;

wherein the gaming server is operative to randomly initiate the play of the bonus game wherein during play of the bonus game, play of the single-player wager game by the workstations is temporarily suspended;

wherein the bonus game is played by those players having accumulated at least one multiplier credit prior to the initiation of play of the bonus game by the gaming server;

wherein multiplier credit for the players accumulates during a period prior to a triggering of the bonus game by the gaming server and is not subject to decrease during said period due to a change in a rate of play or temporary interruption of play by the player; and wherein the bonus game is characterized by a result for each player participating in the bonus game randomly generated by the bonus device from the set of finite possible outcomes, and winnings in the bonus game being the product of the multiplier credit multiplied by the result, whereby a player participating in the bonus game obtains the winnings in the bonus game from the game's proprietor and their winnings are independent of results for other players participating in the bonus game and are not shared with such other players.

12. The apparatus of claim 11, wherein the bonus device comprises a spinning wheel having a multitude of spokes, each spoke being assigned a result in the form of an integer wheel multiplier, with a player participating in the bonus game winning an amount equal to the player's accumulated multiplier credit upon initiation of the play of the bonus game multiplied by the wheel multiplier for the spoke of the wheel that comes to a rest in a position around the periphery of the wheel which is associated with the player.

13. The apparatus of claim 11, wherein the bonus device comprises a spinning reel having a pay line, the reel having indexed positions each comprising a result in the form of an integer, wherein the winning in the bonus game for a player participating in the bonus game is the product of the integer for the indexed position coming to rest on the pay line multiplied by the multiplier credit for such player.

14. The apparatus of claim 11, wherein the bonus device comprises a machine randomly selecting a ball from a plurality of balls, each of the plurality of balls associated with a result in the form of an integer, wherein the winning in the bonus game for a player participating in the bonus game is the product of the integer on the selected ball multiplied by the multiplier credit for such player.

15. The apparatus of claim 11, wherein the single-player wager game comprises a video slots game.

16. The apparatus of claim 15, wherein the video slots game comprises a five reel slots game having a multitude of pay lines.

17. The apparatus of claim 16, wherein the pay table for the single-player game comprises a table of credit awards for particular combinations of symbols appearing on one or more pay lines, the pay table further comprising awards of multiplier credits awarded to the player for an occurrence of two or more like symbols associated with a bonus game multiplier credit appearing on the one or more pay lines.

18. A method for facilitating play of a multiplayer game by multiple players each playing an instance of single-player wager game at a workstation having a display, comprising the steps of:

in a gaming server, aggregating multiple single-player wager game instances into a multiplayer game environment wherein the gaming server transmits datagrams to the workstations containing information whereby each player can view game action of other aggregated players on their display in addition to each player's own game action;

providing in the single-player wager game a pay table in which one of a plurality of possible rewards for a turn of play of the single-player wager game is an award of a multiplier credit useable in a bonus game aspect of the single-player wager game;

in the gaming server, randomly initiating play of the bonus game wherein during play of the bonus game, play of the single-player wager game by the workstations is temporarily suspended;

wherein the bonus game is played by those players having accumulated at least one multiplier credit prior to the initiation of play of the bonus game by the gaming server;

wherein multiplier credit for the players accumulates during a period prior to the triggering of the bonus game by the gaming server and is not subject to decrease in said period due to a change in a rate of play or temporary interruption of play by the player; and generating for each player participating in the bonus game a result, the result generated randomly from a set of finite possible outcomes, wherein winnings in the bonus game for a player participating in the bonus game is the product of the player's multiplier credit multiplied by the result, whereby a player participating in the bonus game obtains the winnings in the bonus game from the game's proprietor and the player's winnings are independent of results for other players participating in the bonus game and are not shared with such other players.

19. The method of claim 18, wherein the result is generated randomly by a bonus device.

20. The method of claim 19, wherein the bonus device comprises a spinning wheel having a multitude of spokes, each spoke being assigned a result in the form of an integer wheel multiplier, with a player participating in the bonus game winning an amount equal to the player's accumulated multiplier credit upon-initiation of the play of the bonus game multiplied by the wheel multiplier for the spoke of the wheel that comes to a rest in a position around the periphery of the wheel which is associated with the player's workstation.

21. The method of claim 19, wherein the bonus device comprises a spinning reel having a pay line, the reel having indexed positions each comprising a result in the form of an integer, wherein the winning in the bonus game for a player participating in the bonus game is the product of the integer for the indexed position coming to rest on the pay line multiplied by the multiplier credit for such player.

22. The method of claim 19, wherein the bonus device comprises a machine randomly selecting a ball from a plurality of balls, each of the plurality of balls associated with a result in the form of an integer, wherein the winning in the bonus game for a play participating in the bonus game is the product of the integer on the selected ball multiplied by the multiplier credit for such player.

23. The method of claim 19, wherein the bonus device comprises a random number generator.

24. The method of claim 18, wherein the single-player wager game comprises a video slots game.

25. The method of claim 24, wherein the video slots game comprises a five reel slots game having a multitude of pay lines.

26. The method of claim 25, wherein the pay table for the single-player game comprises a table of credit awards for particular combinations of symbols appearing on one or more pay lines, the pay table further comprising awards of multiplier credits awarded to the player for the occurrence of two or more like symbols associated with bonus game multiplier credit appearing on the one or more pay lines.

* * * * *